US012802393B2

(12) United States Patent
Yamashita

(10) Patent No.: US 12,802,393 B2
(45) Date of Patent: Nov. 17, 2026

(54) INFORMATION PROCESSING WITH IMAGE GROUPING USING SIMILARITY CALCULATION

(71) Applicant: Sony Group Corporation, Tokyo (JP)

(72) Inventor: Yuya Yamashita, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 247 days.

(21) Appl. No.: 18/699,519

(22) PCT Filed: Nov. 17, 2022

(86) PCT No.: PCT/JP2022/042661
§ 371 (c)(1),
(2) Date: Apr. 8, 2024

(87) PCT Pub. No.: WO2023/100664
PCT Pub. Date: Jun. 8, 2023

(65) Prior Publication Data
US 2024/0412481 A1 Dec. 12, 2024

(30) Foreign Application Priority Data
Dec. 1, 2021 (JP) ................................ 2021-195414

(51) Int. Cl.
*G06V 10/44* (2022.01)
*G06F 16/55* (2019.01)
(Continued)

(52) U.S. Cl.
CPC .............. *G06V 10/44* (2022.01); *G06F 18/23* (2023.01); *G06V 10/761* (2022.01);
(Continued)

(58) Field of Classification Search
CPC .... G06V 10/44; G06V 10/761; G06V 10/762; G06V 10/82; G06V 20/30;
(Continued)

(56) References Cited

U.S. PATENT DOCUMENTS

2006/0173746 A1* 8/2006 Cooper .................. G06F 18/23 705/7.11
2012/0257083 A1* 10/2012 Komiyama ............ G11B 27/34 348/231.5

(Continued)

FOREIGN PATENT DOCUMENTS

JP 2009055152 A 3/2009
JP 2009265874 A 11/2009
JP 2015041234 A * 3/2015
JP 2019082959 A 5/2019
WO 2017029758 A1 2/2017

OTHER PUBLICATIONS

C. Guo, X. Tian and T. Mei, "Multigranular Event Recognition of Personal Photo Albums," in IEEE Transactions on Multimedia, vol. 20, No. 7, pp. 1837-1847, Jul. 2018, doi: 10.1109/TMM.2017.2777664. (Year: 2018).*

(Continued)

*Primary Examiner* — Sumati Lefkowitz
*Assistant Examiner* — Ryan P Potts
(74) *Attorney, Agent, or Firm* — Michael Best & Friedrich LLP

(57) ABSTRACT

Image processing apparatuses, image processing methods, and programs with more accurate grouping of captured images are disclosed. In one example, an image processing apparatus includes a processor configured to extract, from a captured image, a feature amount related to the captured image, to extract, from the captured image, an imaging time at which the captured image has been imaged, and to group the captured images, on the basis of the feature amounts and the imaging times extracted from the respective captured images. Embodiments of captured image grouping can, for example, be applied to a cloud server that provides services via the Internet.

14 Claims, 17 Drawing Sheets

(51) Int. Cl.

| | |
|---|---|
| ***G06F 16/75*** | (2019.01) |
| ***G06F 18/23*** | (2023.01) |
| ***G06V 10/74*** | (2022.01) |
| ***G06V 10/762*** | (2022.01) |
| ***G06V 10/82*** | (2022.01) |
| ***G06V 20/30*** | (2022.01) |
| ***H04N 23/60*** | (2023.01) |

(52) U.S. Cl.
CPC ............ *G06V 10/762* (2022.01); *G06V 10/82* (2022.01); *G06V 20/30* (2022.01); *H04N 23/60* (2023.01); *G06F 16/55* (2019.01); *G06F 16/75* (2019.01); *G06T 2207/10004* (2013.01); *G06T 2207/10016* (2013.01); *G06V 2201/10* (2022.01)

(58) Field of Classification Search
CPC .. G06V 2201/10; H04N 23/60; H04N 9/8205; G06F 16/55; G06F 16/75; G06F 18/23; G06F 16/285; G06T 2207/10004; G06T 2207/10016
See application file for complete search history.

(56) References Cited

U.S. PATENT DOCUMENTS

| | | | | | |
|---|---|---|---|---|---|
| 2012/0328190 | A1* | 12/2012 | Bercovich | G06F 16/55 | 382/165 |
| 2015/0193659 | A1* | 7/2015 | Mitsuhashi | G06V 20/00 | 382/224 |
| 2020/0065613 | A1* | 2/2020 | Ko | G06F 3/0482 | |
| 2020/0151210 | A1* | 5/2020 | Kojima | G06T 7/70 | |

OTHER PUBLICATIONS

International Search Report (PCT/ISA/210), International Application No. PCT/JP2022/042661, dated Jan. 24, 2023.
Cooper M et al., "Temporal Event Clustering for Digital Photo Collections", ACM Transactions on Multimedia Computing, Communications Andapplications, vol. 1, No. 3, Aug. 2005.
Jun Li et al., "Automatic Summarization for Personal Digital Photos", ICICS-PCM 2003, Dec. 15-18, 2003, pp. 1536-1540, Singapore.

* cited by examiner

INFORMATION PROCESSING WITH IMAGE GROUPING USING SIMILARITY CALCULATION

TECHNICAL FIELD

The present disclosure relates to an image processing apparatus, an image processing method, and a program, and more particularly, to an image processing apparatus, an image processing method, and a program that enable more accurate grouping of captured images.

BACKGROUND ART

Programs having a function of automatically editing a captured image such as a still image or a moving image captured by a user have been provided. For example, Patent Document 1 discloses a program for designating a template as a program for automatically editing a moving image.

CITATION LIST

Patent Document

Patent Document 1: Japanese Patent Application Laid-Open No. 2009-55152

SUMMARY OF THE INVENTION

Problems to be Solved by the Invention

In providing a moving image production service for editing captured images to create a moving image, there are cases where a plurality of captured images is grouped for each scene, and it is required to group captured images more accurately.

The present disclosure has been made in view of such circumstances, and is to enable more accurate grouping of captured images.

Solutions to Problems

An image processing apparatus according to one aspect of the present disclosure is an image processing apparatus including a processing unit that extracts, from a captured image, a feature amount related to the captured image, extracts, from the captured image, an imaging time at which the captured image has been imaged, and groups a plurality of the captured images, on the basis of the feature amounts and the imaging times extracted from the respective captured images.

An image processing method according to one aspect of the present disclosure is an image processing method including: by an image processing apparatus, extracting, from a captured image, a feature amount related to the captured image; extracting, from the captured image, an imaging time at which the captured image has been imaged; and grouping a plurality of the captured images, on the basis of the feature amounts and the imaging times extracted from the respective captured images.

A program according to one aspect of the present disclosure is a program for causing a computer to function as a processing unit that extracts, from a captured image, a feature amount related to the captured image, extracts, from the captured image, an imaging time at which the captured image has been imaged, and groups a plurality of the captured images, on the basis of the feature amounts and the imaging times extracted from the respective captured images.

In an image processing apparatus, an image processing method, and a program according to one aspect of the present disclosure, a feature amount related to a captured image is extracted from the captured image, an imaging time at which the captured image has been imaged is extracted from the captured image, and a plurality of the captured images is grouped on the basis of the feature amounts and the imaging times extracted from the respective captured images.

Note that an image processing apparatus according to one aspect of the present disclosure may be an independent apparatus or an internal block forming one apparatus.

MODE FOR CARRYING OUT THE INVENTION

<Example System Configuration>

Figure 1:
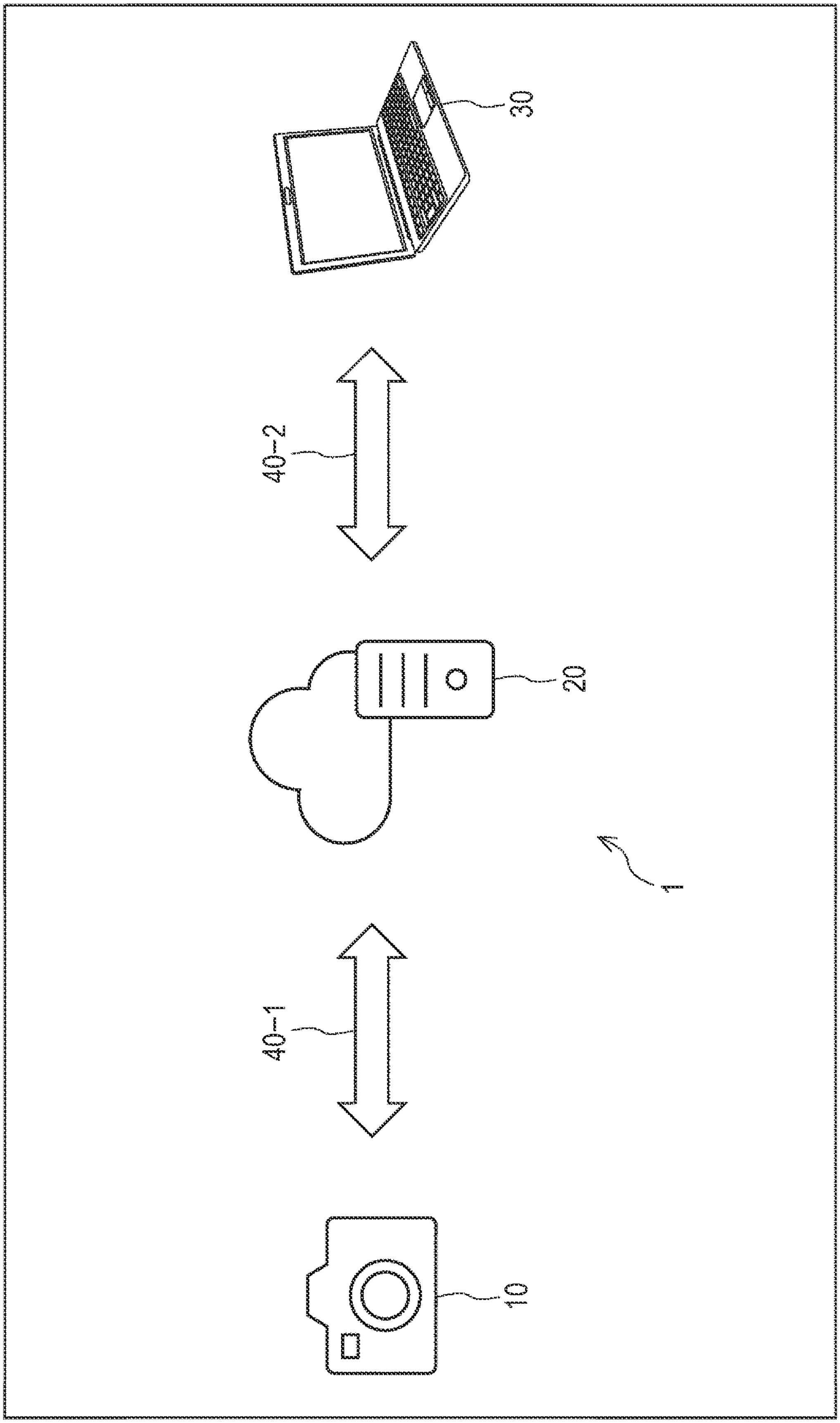
FIG. 1 is a diagram illustrating an example configuration of an embodiment of a moving image production system to which the present disclosure is applied.

FIG. 1 is a diagram illustrating an example configuration of an embodiment of a moving image production system to which the present disclosure is applied.

A moving image production system 1 in FIG. 1 is a system that produces a moving image from an image captured by a user. The moving image production system 1 includes a camera 10, a cloud server 20, and a terminal device 30.

The camera 10 is a digital camera capable of capturing moving images and still images. The camera 10 is not necessarily a digital camera, and may be a device having an imaging function, such as a smartphone or a tablet terminal. The camera 10 captures an image of the object in accordance with a user's operation, and records the captured image obtained as a result.

The captured image includes a moving image and a still image. In the description below, in a case where it is necessary to distinguish between a moving image as a captured image and a moving image automatically produced by a moving image production service, the latter will be referred to as a produced moving image.

The image captured by the camera 10 is transmitted to the cloud server 20. The camera 10 can transmit the captured image to the cloud server 20 via a network 40-1. Alternatively, the terminal device 30 may transmit the captured image to the cloud server 20 via a network 40-2 by transferring the captured image from the camera 10 to the terminal device 30, using a memory card such as a flash memory, wireless communication such as a wireless local area network (LAN), or the like.

The network 40-1 and the network 40-2 include communication lines of the Internet, a mobile telephone network, or the like. The network 40-1 and the network 40-2 may be the same network, or may be different networks. Hereinafter, in a case where the network 40-1 and the network 40-2 do not need to be distinguished from each other, they will be referred to as the network 40.

The cloud server 20 is a server that provides a moving image production service for producing (automatically producing) a produced moving image from a captured image through the network 40. The cloud server 20 is an example of an image processing apparatus to which the present disclosure is applied. The cloud server 20 receives the image captured by the camera 10 via the network 40. The cloud server 20 creates a produced moving image by performing processing such as editing on the captured image, and transmits the produced moving image to the terminal device 30 via the network 40.

The terminal device 30 is a device such as a personal computer (PC), a tablet terminal, or a smartphone. The terminal device 30 performs processing such as setting related to the moving image production service and editing of a produced moving image, in accordance with a user's operation. The terminal device 30 receives the produced moving image transmitted from the cloud server 20 via the network 40. The terminal device 30 records the produced moving image in the terminal, or outputs the produced moving image to the outside.

<Example Configuration of the Camera>

Figure 2:
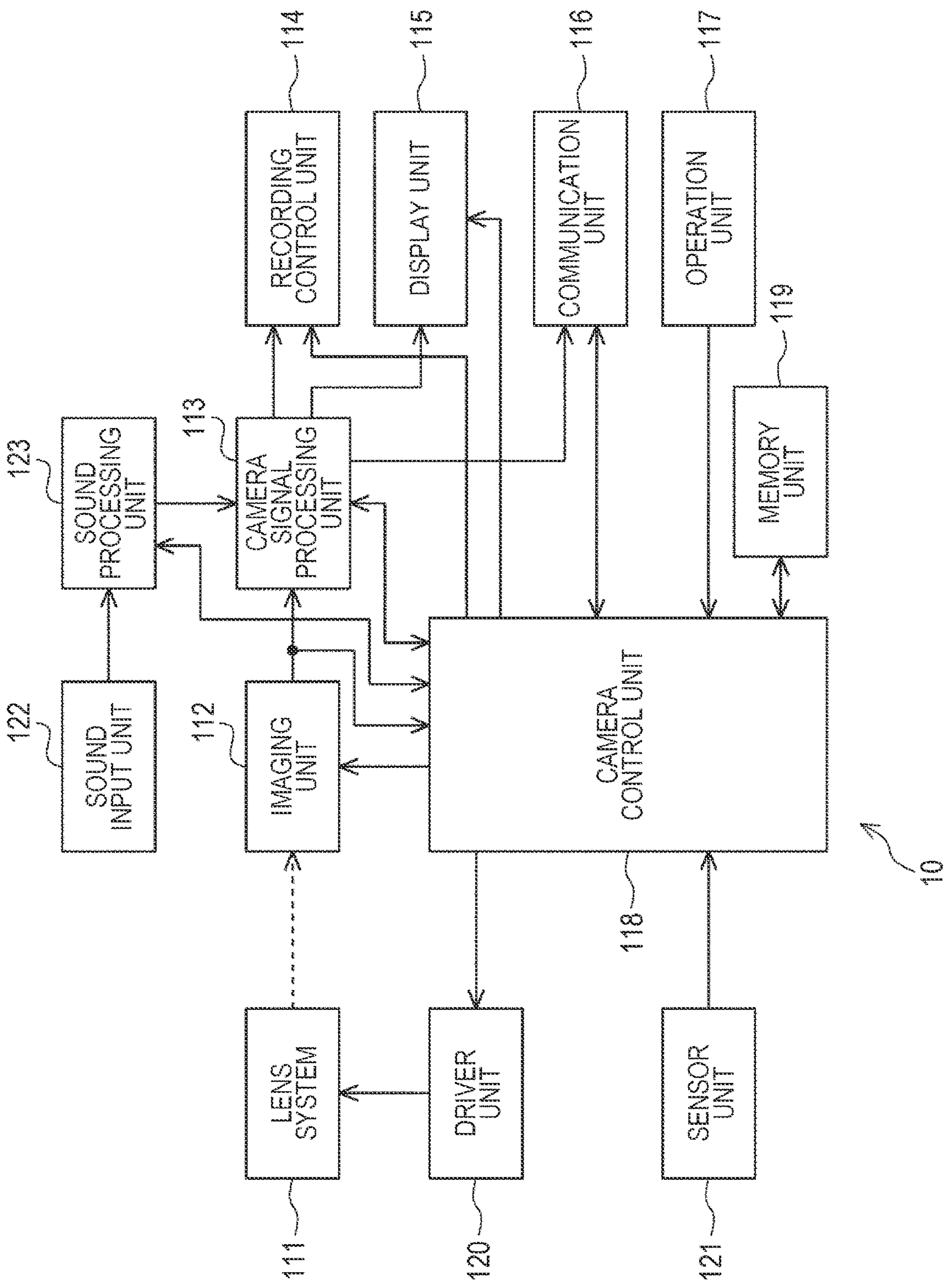
FIG. 2 is a block diagram illustrating an example configuration of a camera.

FIG. 2 is a block diagram illustrating an example configuration of the camera 10 shown in FIG. 1.

As illustrated in FIG. 2, the camera 10 includes a lens system 111, an imaging unit 112, a camera signal processing unit 113, a recording control unit 114, a display unit 115, a communication unit 116, an operation unit 117, a camera control unit 118, a memory unit 119, a driver unit 120, a sensor unit 121, a sound input unit 122, and a sound processing unit 123.

The lens system 111 captures incident light (image light) from the object, and causes the incident light to enter the imaging unit 112. The imaging unit 112 includes a solid-state imaging element such as a complementary metal oxide semiconductor (CMOS) image sensor. The imaging unit 112 converts the amount of incident light gathered as an image on the imaging surface of the solid-state imaging element by the lens system 111 into an electrical signal for each pixel, and outputs the electrical signal as a pixel signal.

The camera signal processing unit 113 includes a digital signal processor (DSP), a frame memory that temporarily records image data, and the like. The camera signal processing unit 113 performs various kinds of signal processing on the image signal output from the imaging unit 112, and outputs the resultant image data of the captured image. In this manner, the lens system 111, the imaging unit 112, and the camera signal processing unit 113 constitute an imaging system.

The recording control unit 114 records the image data of the image captured by the imaging system into a storage medium including a memory card such as a flash memory. The display unit 115 includes a liquid crystal display, an organic EL display, or the like, and displays the image captured by the imaging system.

The communication unit 116 includes a communication module or the like compatible with a predetermined communication scheme such as wireless communication including a wireless LAN or cellular communication (the 5th Generation (5G), for example), and transmits the image data of the image captured by the imaging system to other devices including the cloud server 20 via the network 40 or the like. The operation unit 117 includes an operation system such as physical buttons or a touch panel, and issues operation commands for various functions of the camera 10 in accordance with an operation performed by a user.

The camera control unit 118 includes a processor such as a central processing unit (CPU) or a microprocessor, and controls operation of each component of the camera 10. The memory unit 119 records various kinds of data, under the control of the camera control unit 118. The driver unit 120 drives the lens system 111 to realize autofocusing, zooming, and the like, under the control of the camera control unit 118.

The sensor unit 121 performs sensing of space information, time information, and the like, and outputs a sensor signal obtained as a result of the sensing. For example, the sensor unit 121 includes various kinds of sensors such as a gyroscope sensor and an acceleration sensor.

The sound input unit 122 includes a microphone and the like, collects sound such as a user's voice and environmental sounds, and outputs the resultant sound signal. The sound processing unit 123 performs sound signal processing on the sound signal output from the sound input unit 122. The sound signal from the sound processing unit 123 is input to the camera signal processing unit 113, and is processed in synchronization with the image signal under the control of the camera control unit 118, so that the sound signal is recorded as the sound (voice) of the moving image.

<Example Configuration of the Cloud Server>

Figure 3:
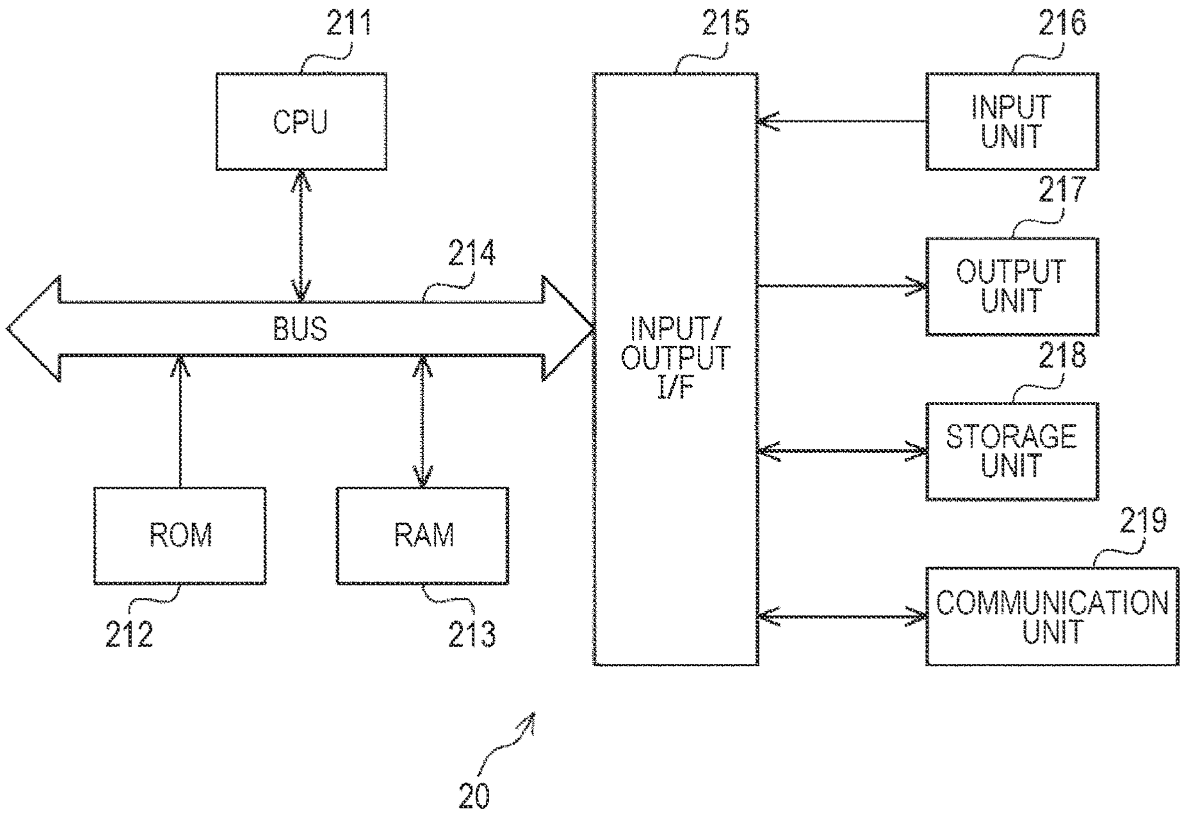
FIG. 3 is a block diagram showing an example configuration of a cloud server.

FIG. 3 is a block diagram illustrating an example configuration of the cloud server 20 shown in FIG. 1.

As illustrated in FIG. 3, in the cloud server 20, a CPU 211, a read only memory (ROM) 212, and a random access memory (RAM) 213 are mutually connected by a bus 214. An input/output I/F 215 is further connected to the bus 214. An input unit 216, an output unit 217, a storage unit 218, and a communication unit 219 are connected to the input/output I/F 215.

The input unit 216 supplies various kinds of input signals to each of the components including the CPU 211 via the input/output I/F 215. For example, the input unit 216 includes a keyboard, a mouse, a microphone, and the like.

The output unit 217 outputs various kinds of information via the input/output I/F 215, under the control of the CPU 211. For example, the output unit 217 includes a display, a speaker, and the like.

The storage unit 218 is formed as an auxiliary storage device such as a semiconductor memory or a hard disk drive (HDD). The storage unit 218 records various kinds of data and programs, under the control of the CPU 211. The CPU 211 reads various kinds of data from the storage unit 218 and processes the various kinds of data, or executes a program.

The communication unit 219 includes a communication module or the like compatible with wireless communication such as a wireless LAN or cellular communication (5G, for example), or cable communication. The communication unit 219 communicates with other devices including the camera 10 and the terminal device 30 via the network 40, under the control of the CPU 211.

Note that the configuration of the cloud server 20 illustrated in FIG. 3 is an example, and image processing may be performed by a dedicated processor such as a graphics processing unit (GPU), for example.

<Example Configuration of the Terminal Device>

Figure 4:
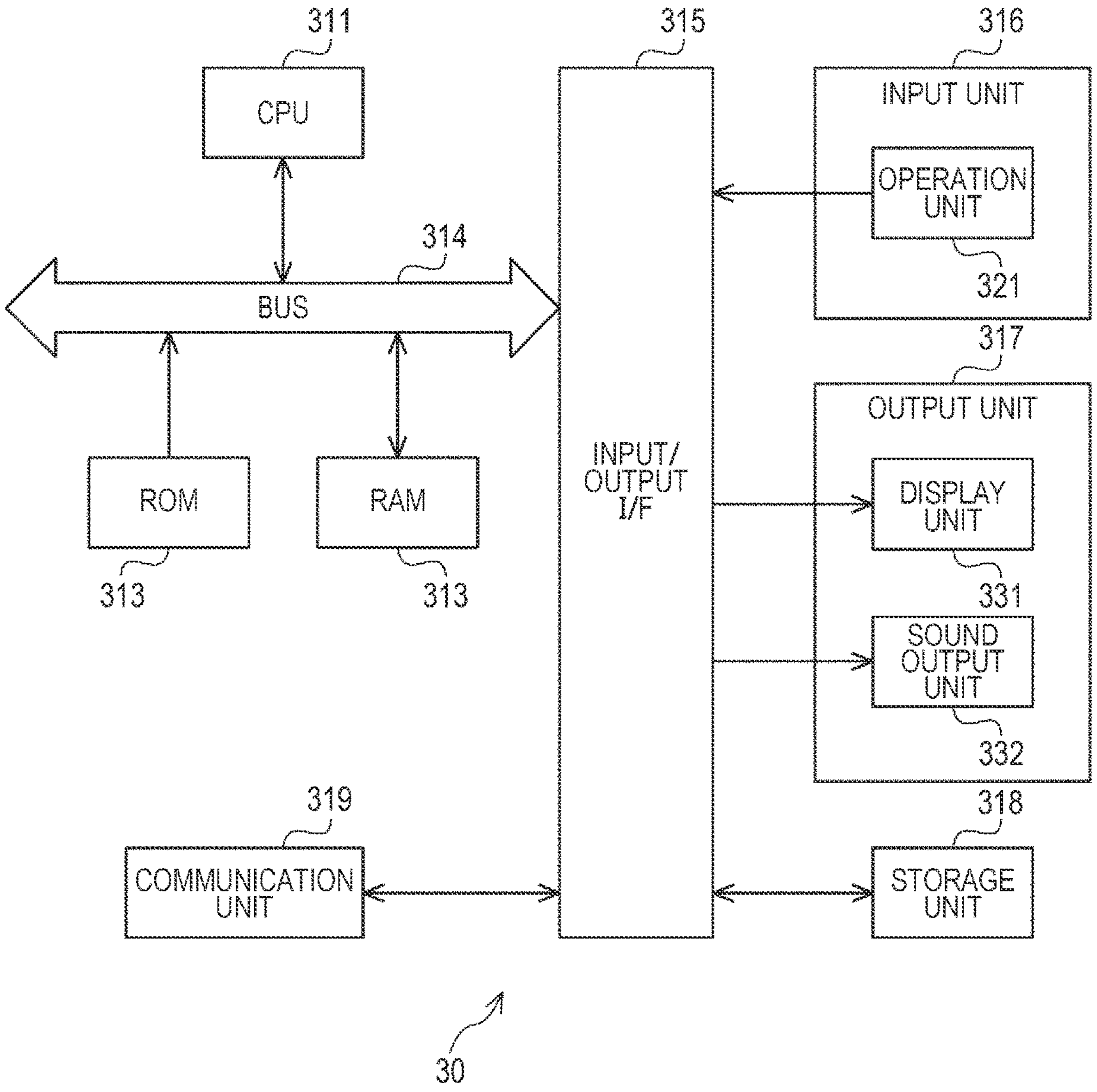
FIG. 4 is a block diagram illustrating an example configuration of a terminal device.

FIG. 4 is a block diagram illustrating an example configuration of the terminal device 30 shown in FIG. 1.

As illustrated in FIG. 4, in the terminal device 30, a CPU 311, a ROM 312, and a RAM 313 are mutually connected by a bus 314. An input/output I/F 315 is further connected to the bus 314. An input unit 316, an output unit 317, a storage unit 318, and a communication unit 319 are connected to the input/output I/F 315.

The input unit 316 supplies various kinds of input signals to each of the components including the CPU 311 via the input/output I/F 315. For example, the input unit 316 includes an operation unit 321. The operation unit 321 includes a keyboard, a mouse, a microphone, physical buttons, a touch panel, or the like. The operation unit 321 is operated by the user, and supplies an operation signal corresponding to the operation to the CPU 311.

The output unit 317 outputs various kinds of information via the input/output I/F 315, under the control of the CPU 311. For example, the output unit 317 includes a display unit 331 and a sound output unit 332.

The display unit 331 includes a liquid crystal display, an organic EL display, or the like. The display unit 331 displays a captured image, an editing screen, or the like, under the control of the CPU 311. The sound output unit 332 includes a speaker, headphones connected to an output terminal, or the like. The sound output unit 332 outputs a sound corresponding to a sound signal, under the control of the CPU 311.

The storage unit 318 is formed as an auxiliary storage device such as a semiconductor memory. The storage unit 318 may be formed as an internal storage, or may be an external storage such as a memory card. The storage unit 318 records various kinds of data and programs, under the control of the CPU 311. The CPU 311 reads various kinds of data from the storage unit 318 and processes the various kinds of data, or executes a program.

The communication unit 319 includes a communication module or the like compatible with a predetermined communication scheme such as wireless communication like a wireless LAN or cellular communication (5G, for example), or cable communication. The communication unit 319 communicates with other devices including the cloud server 20 via the network 40, under the control of the CPU 311.

Note that the configuration of the terminal device 30 illustrated in FIG. 4 is an example, and image processing may be performed by a dedicated processor such as a GPU, for example.

In the moving image production system 1 designed as described above, an image captured by the camera 10 is uploaded to the cloud server 20, and processing such as editing using the captured image is performed by the cloud server 20, so that a produced moving image is produced. The terminal device 30 performs setting, editing, and the like related to the produced moving image, and outputs the completed produced moving image.

Note that, for ease of explanation, the moving image production system 1 in FIG. 1 has a configuration in which one camera 10 and one terminal device 30 are provided as illustrated in the drawing. However, one or a plurality of cameras 10 and one or a plurality of terminal devices 30 are provided for each user who uses the moving image production service. The camera 10 and the terminal device 30 may be operated by the same user, or may be operated by different users. The cloud server 20 is installed in a data center or the like, but is not necessarily formed with one server. The cloud server 20 may include a plurality of servers to provide a moving image production service.

<Overall Flow>

Figure 5:
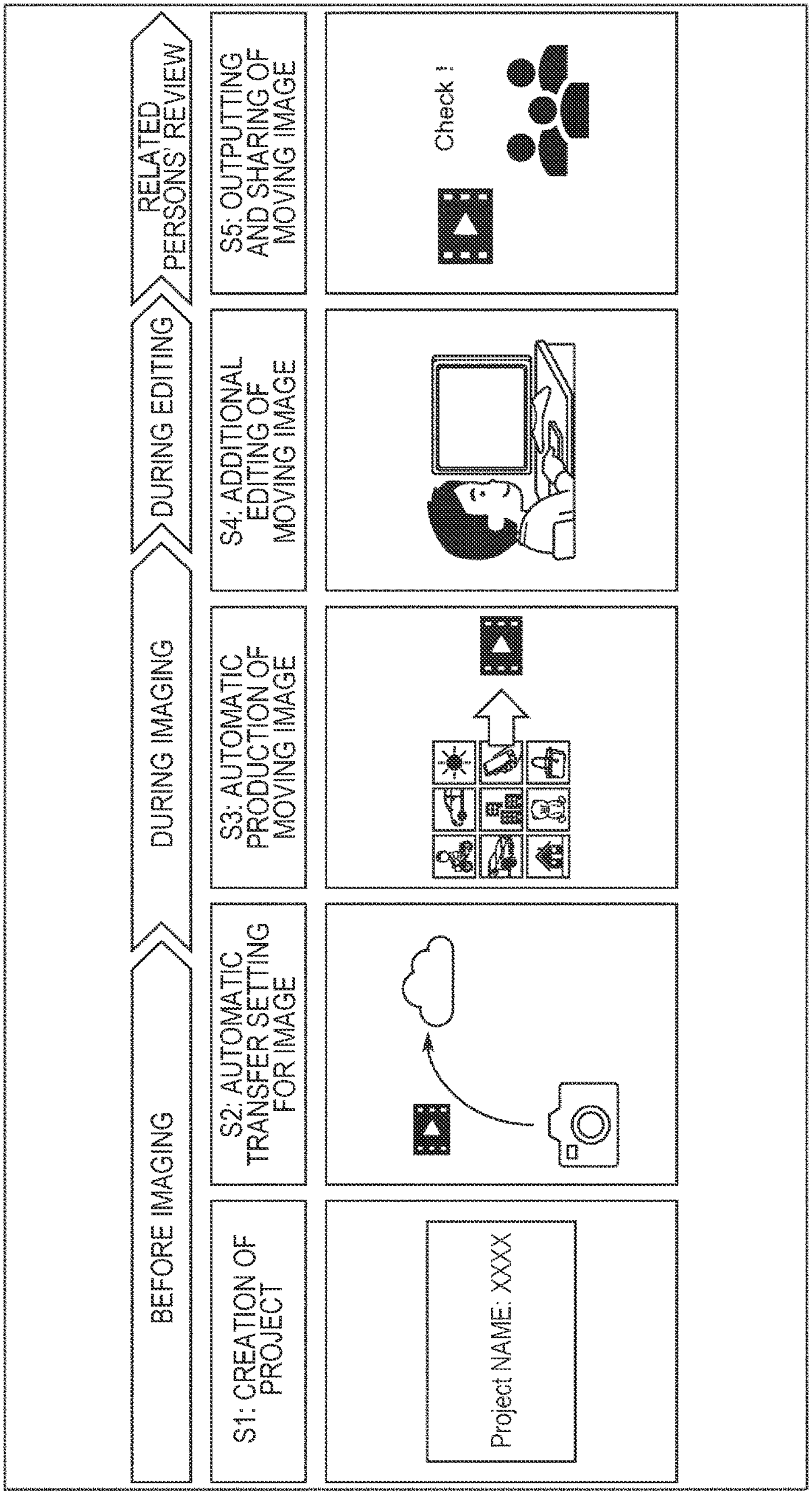
FIG. 5 is a diagram illustrating an overall flow indicating the flow in a moving image production service.

FIG. 5 is a diagram illustrating an overall flow representing the flow in a moving image production service that is provided by the cloud server 20 in the moving image production system 1. The overall flow illustrated in FIG. 5 is divided into before imaging, during imaging, during editing, and a related persons' review, with the direction from the left side toward the right side being the direction of time.

Before the imaging, creation of a project (S1) and automatic transfer setting of a captured image (S2) are performed. In the creation of a project, a project name is input by the user, and a project for managing information regarding creation of a produced moving image is created. In the automatic transfer setting of a captured image, an automatic transfer destination of an image captured by the camera 10 is set. For example, location information (the uniform resource locator (URL) or the like) about the cloud server 20 is set as the automatic transfer destination.

The creation of the project and the automatic transfer setting can be performed from the camera 10 or the terminal device 30 in accordance with a user operation. Alternatively, the setting may be performed from another device such as a smartphone possessed by the user.

During the imaging, a moving image is automatically produced (S3). In the automatic production of a moving image, the cloud server 20 creates a produced moving image, using a captured image transferred from the camera 10. Although details will be described later, in the automatic creation of a moving image, processing such as automatic selection, automatic trimming, and automatic quality correction is performed using a captured image.

During the editing, additional editing (S4) of the moving image is performed. In the additional editing of the moving image, the terminal device 30 additionally edits the produced moving image in accordance with a user operation. This additional editing is not necessarily performed. In a case where the user determines that it is not necessary to edit the produced moving image, it is not necessary to perform additional editing.

In the related persons' review, the moving image is output and shared (S5). In the outputting and sharing of the moving image, the terminal device 30 outputs the produced moving image additionally edited as necessary in a predetermined format, and shares the produced moving image with the related persons. As a result, the produced moving image is reviewed by the related persons, are corrected as appropriate in accordance with the result of the review, and are then delivered.

Figure 6:
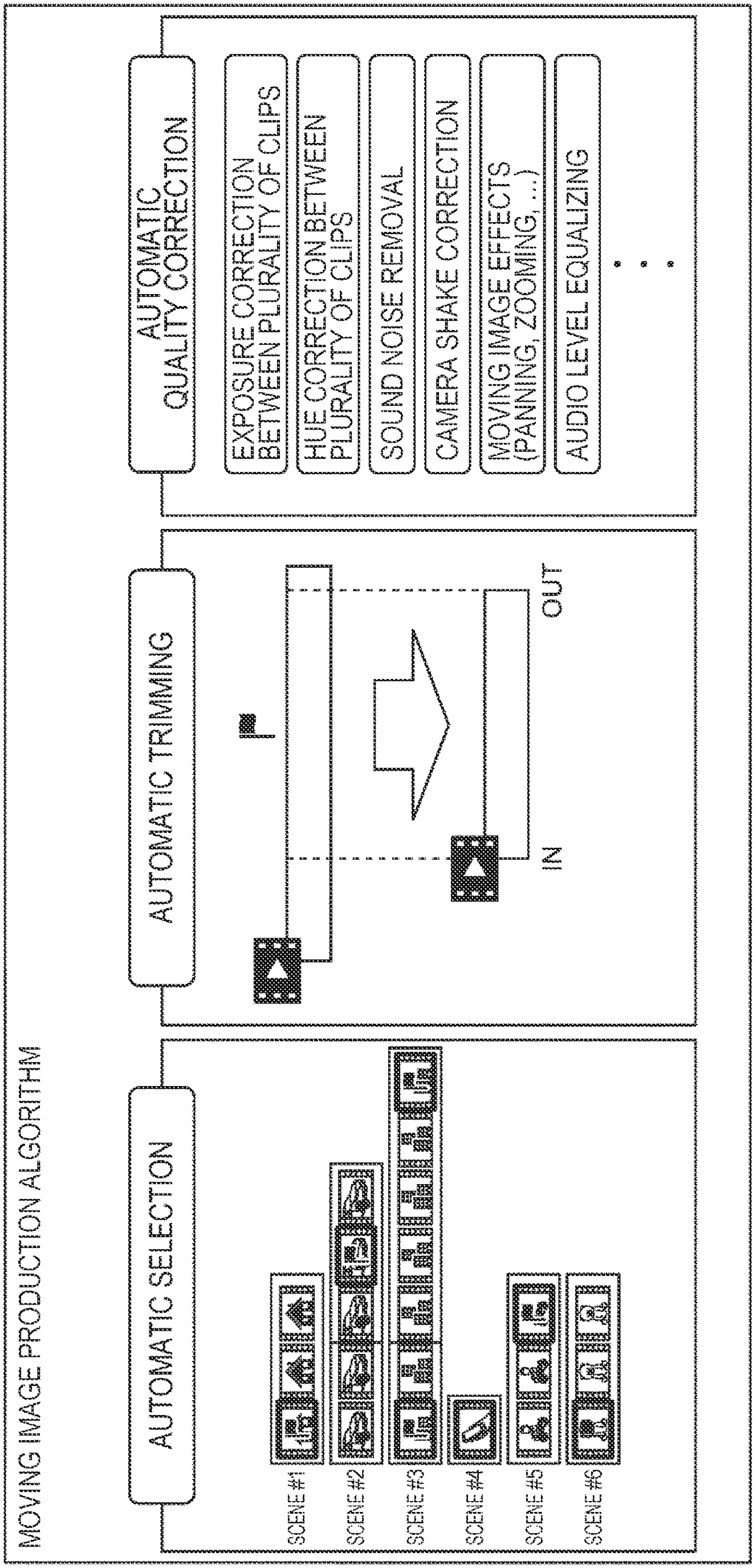
FIG. 6 is a diagram illustrating an example of a moving image production algorithm.

FIG. 6 is a diagram illustrating an example of a moving image production algorithm that is used at the time of moving image production in the automatic production (S3) of the moving image in FIG. 5.

As illustrated in FIG. 6, the moving image production algorithm includes processing such as automatic selection, automatic trimming, and automatic quality correction, and these kinds of processing are performed to create a produced moving image.

In the automatic selection, captured images (clips) including moving images and still images are grouped for each scene (grouping), and an appropriate captured image is selected for each scene. In the automatic trimming, the trimming range of moving images (clips) is designated with an in-point (start point) and an out-point (end point). In a case where a shot mark (the flag in the drawing) depending on an operation by the user is attached to the captured image at a time of imaging, the portions before and after the shot mark are temporally cut off, with the mark serving as the center. Clips are images captured by a device such as the cloud server 20.

In the automatic quality correction, various kinds of corrections are performed on the captured images (clips) to enhance quality. For example, processes such as exposure correction (brightness correction) between a plurality of clips, hue correction (color correction) between the plurality of clips, sound noise removal, camera shake correction, moving image effects such as panning and zooming, and audio level equalizing are performed.

Automatic selection, automatic trimming, and automatic quality correction have been described as an example of the moving image production algorithm herein. However, other processes may be added as long as the processes are necessary in creating a produced moving image.

<Example of Captured Image Grouping>

Figure 7:
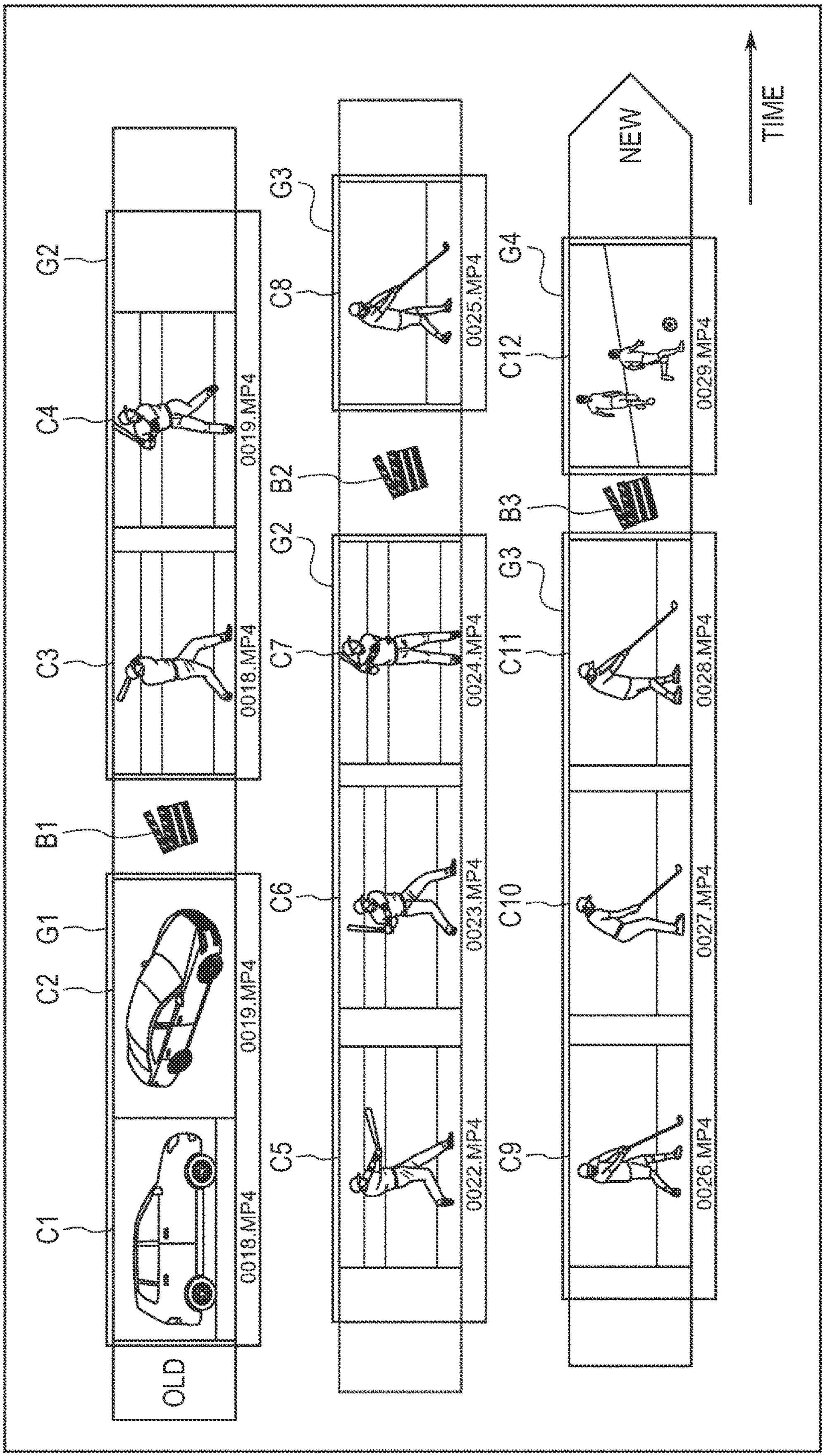
FIG. 7 is a diagram illustrating an example of captured image grouping.

FIG. 7 is a diagram illustrating an example of captured image grouping in automatic selection.

In FIG. 7, to detect scene breaks from a plurality of captured images (short clips) arranged in order of imaging time, the captured images are grouped.

In FIG. 7, among captured images C1 to C12 arranged in order of imaging time, the captured images C1 and C2 are grouped into a group G1, the captured images C3 to C7 are grouped into a group G2, the captured images C8 to C11 are grouped into a group G3, and the captured image C12 is grouped into a group G4.

As such grouping is performed, breaks B1 to B3 between scenes are detected from the captured images C1 to C12 arranged in order of imaging time. Specifically, a break B1 is detected between the captured image C2 and the captured image C3, a break B2 is detected between the captured image C7 and the captured image C8, and a break B3 is detected between the captured image C11 and the captured image C12.

Scenes are divided by the detected breaks B1 to B3, and the scenes are different for each group. That is, the captured images C1 and C2 grouped into the group G1, the captured images C3 to C7 grouped into the group G2, the captured images C8 to C11 grouped into the group G3, and the captured image C12 grouped into the group G4 are different scenes from one another.

<Example of a Functional Configuration>

Figure 8:
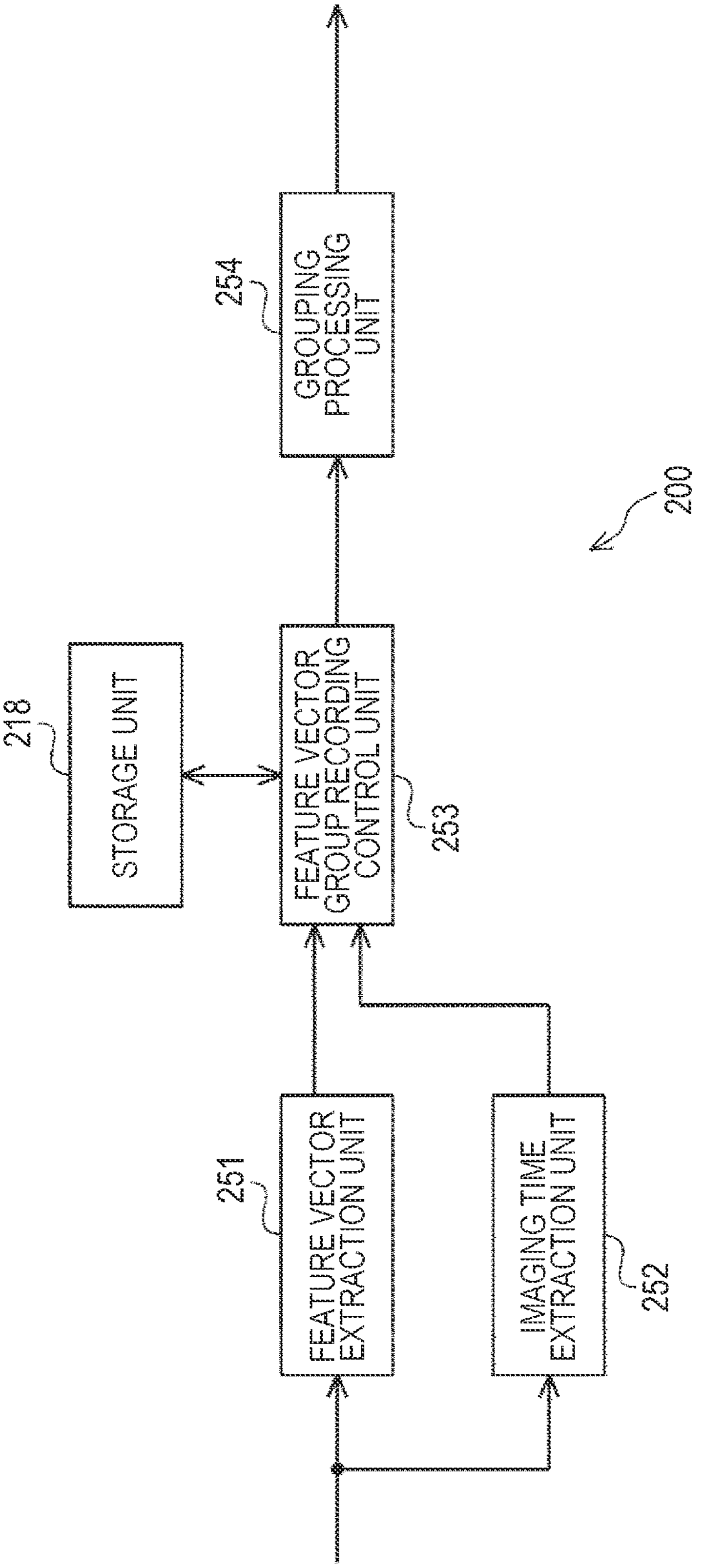
FIG. 8 is a block diagram illustrating an example of the functional configuration of a processing unit in the cloud server.

FIG. 8 is a block diagram illustrating an example of the functional configuration of a processing unit 200 in the cloud server 20. The processing unit 200 is formed by a processor such as the CPU 211 or GPU executing a program such as a moving image production program. Alternatively, the processing unit 200 may be formed as a dedicated circuit.

In FIG. 8, the processing unit 200 performing grouping on captured images using feature vectors extracted for the respective captured images and the imaging times, to detect scene breaks from a plurality of captured images arranged in order of imaging time. The processing unit 200 includes a feature vector extraction unit 251, an imaging time extraction unit 252, a feature vector group recording control unit 253, and a grouping processing unit 254.

The feature vector extraction unit 251 extracts a feature vector from a captured image input thereto, and supplies the feature vector to the feature vector group recording control unit 253.

The feature vector extraction unit 251 can extract a feature vector from a captured image, using a trained model trained by machine learning. As the trained model, a deep neural network (DNN) that has been trained with input images as training data and feature vectors as outputs can be used.

A feature vector is an example of a feature amount related to an image, and some other feature amount may be used. As such a feature amount extraction algorithm based on a DNN, a known technique can be used. Note that feature amounts may be extracted using image processing, rule-based processing, or the like, without any trained model.

In a case where the captured image is a moving image, the feature vector extraction unit 251 extracts a feature vector from each image frame from of a plurality of image frames constituting the moving image. The feature vector extraction unit 251 then calculates basic statistics for the plurality of extracted feature vectors, and sets the representative value obtained through the calculation as a representative feature vector. In a case where the captured image is a moving image, the representative feature vector can be used as the feature vector. As the representative value obtained through the calculation of the basic statistics, the average value, the median value, the mode value, and the like can be used.

The imaging time extraction unit 252 extracts an imaging time from a captured image input thereto, and supplies the imaging time to the feature vector group recording control unit 253.

In a case where the captured image is a still image, the imaging time extraction unit 252 can extract the imaging time of the still image, using exchangeable image file format (Exif) information or the like. In a case where the captured image is a moving image, the imaging time extraction unit 252 can extract the imaging time of the moving image, using metadata. The imaging time of a still image or a moving image is not necessarily obtained with the use of Exif information or metadata, but may be manually input via a predetermined interface by the user, for example.

The feature vector from the feature vector extraction unit 251 and the imaging time from the imaging time extraction unit 252 are supplied to the feature vector group recording control unit 253. The feature vector group recording control unit 253 associates the feature vector extracted for each captured image with each corresponding imaging time, and records the associated feature vector and imaging time in the storage unit 218. The feature vector group recording control unit 253 also reads the feature vectors and the imaging times recorded in the storage unit 218 as necessary, and supplies the feature vectors and the imaging times to the grouping processing unit 254.

The feature vector extracted for each captured image and each corresponding imaging time are supplied from the feature vector group recording control unit 253 to the grouping processing unit 254. The grouping processing unit 254 performs grouping on the captured images, on the basis of the feature vectors and the imaging times. In the grouping processing unit 254, a similarity between a plurality of feature vectors included in a feature vector group that is a group of feature vectors extracted for the respective captured images is calculated, and the captured images are grouped on the basis of a result of threshold determination for the calculated similarity.

For example, the grouping processing unit 254 sorts the feature vector group in order of imaging time, and calculates a similarity between preceding and subsequent feature vectors included in the sorted feature vector group. The grouping processing unit 254 then compares the calculated similarity with a threshold, and, in a case where the similarity is lower than the threshold, the group is divided between the two captured images from which the feature vectors having the calculated similarity have been extracted. As this process is performed on all the feature vectors included in the feature vector group, grouping is performed on the input captured images.

As the processing unit 200 performs the above grouping, captured images including moving images and still images are divided for each scene, and an appropriate captured image is selected from each scene, so that automatic selection is performed. Further, in the processing unit 200, processes such as automatic trimming and automatic quality correction are performed in addition to the automatic selection, and thus, a produced moving image is created.

<Example of an Algorithm>

Figure 9:
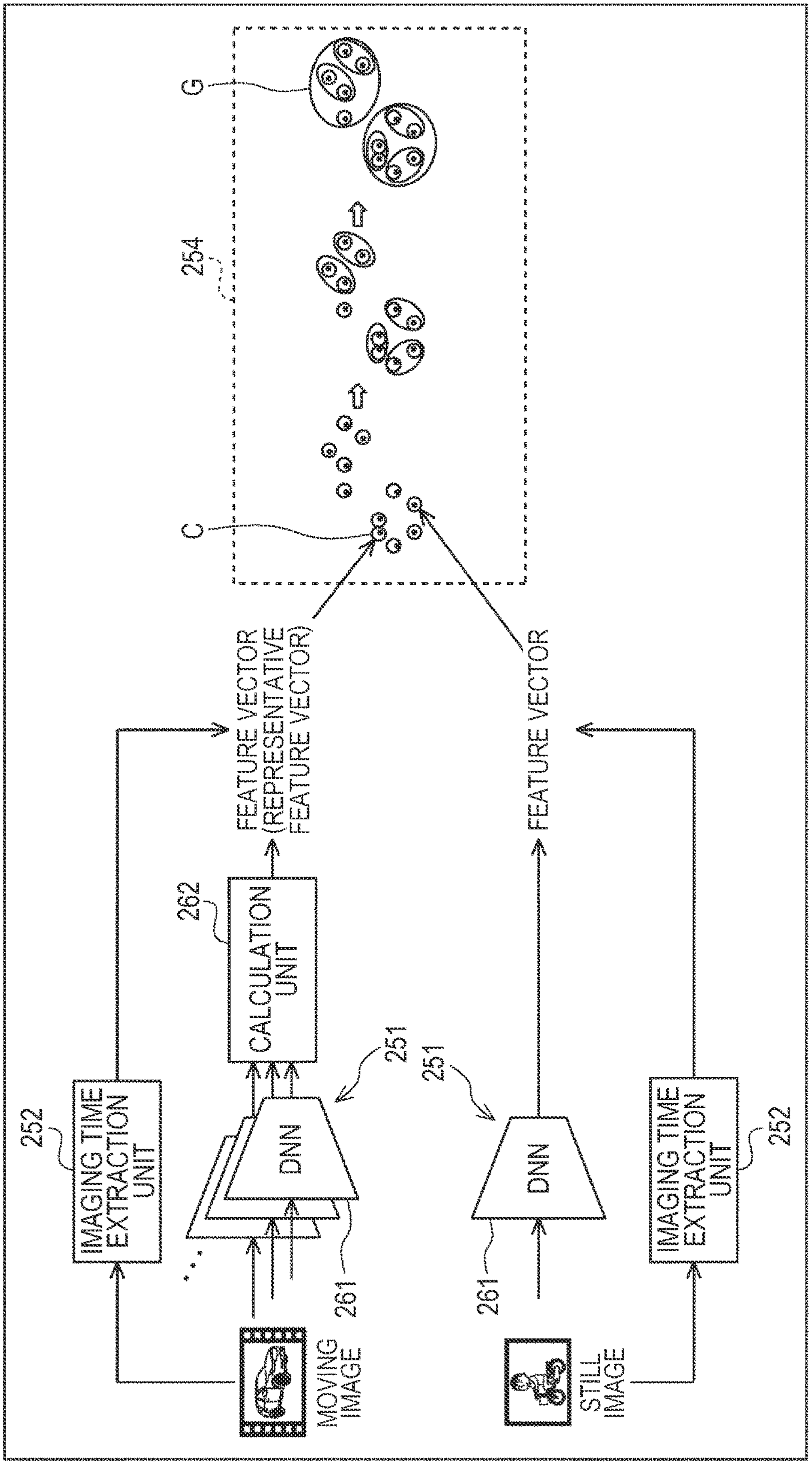
FIG. 9 is a diagram illustrating an example of a captured image grouping algorithm.

FIG. 9 is a diagram illustrating an example of a captured image grouping algorithm. In FIG. 9, both a moving image and a still image are input as captured images.

As illustrated in the upper portion of FIG. 9, in a case where the captured image is a moving image, in the feature vector extraction unit 251, each image frame of a plurality of image frames constituting the moving image is input to a trained model 261, and feature vectors based on the input image frames are output. A calculation unit 262 calculates a representative value (such as an average value) of a plurality of feature vectors output from the trained model 261, and outputs the calculated representative feature vector as the feature vector of the moving image.

In a case where the captured image is a moving image, the imaging time extraction unit 252 extracts the imaging time from metadata or the like of the moving image. As a result, the feature vector (representative feature vector) and the imaging time associated with each input moving image are extracted.

As illustrated in the lower portion of FIG. 9, in a case where the captured image is a still image, in the feature vector extraction unit 251, the still image is input to the trained model 261, and a feature vector based on the input still image is output. In a case where the captured image is a still image, the imaging time extraction unit 252 extracts the imaging time from Exif information or the like about the still image. As a result, the feature vector and the imaging time associated with each input still image are extracted.

The feature vector (representative feature vector) and the imaging time extracted for each input moving image, and the feature vector and the imaging time extracted for each input still image are input to the grouping processing unit 254. The grouping processing unit 254 groups similar captured images by clustering, using a combination of feature vectors and imaging times of captured images including a moving image and a still image.

In the clustering, a similarity between feature vectors before and after a feature vector group sorted in order of imaging time is calculated, so that similar captured images can be grouped. A Euclidean distance, a cosine distance, or the like can be used as the similarity between feature vectors. For example, as schematically indicated by a dashed line in FIG. 9, feature vectors are grouped by clustering, so that clips C of a moving image or a still image are divided into groups G.

<Example of a Grouping Result>

Figure 10:
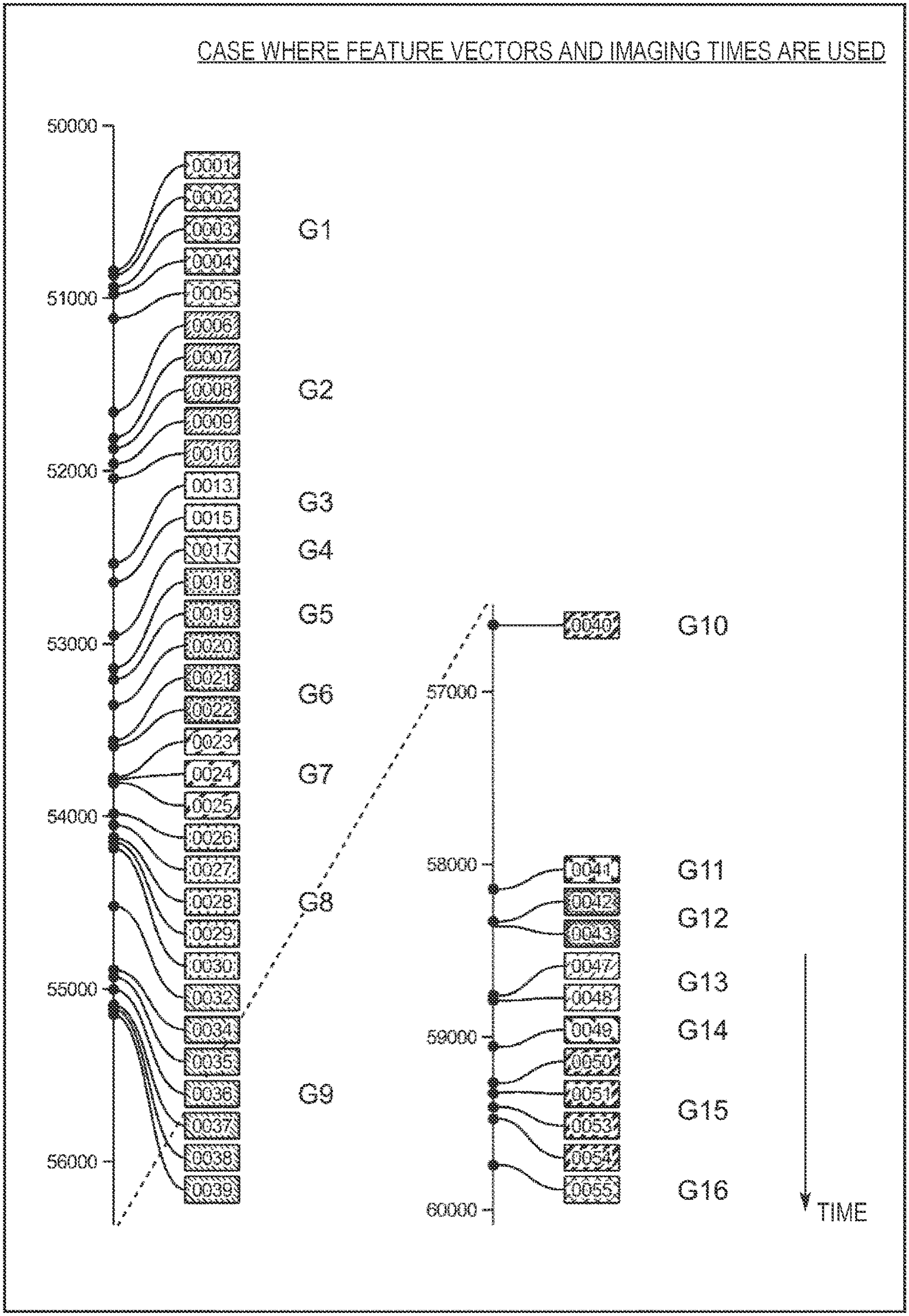
FIG. 10 is a diagram illustrating an example of captured image grouping using feature vectors and imaging times.

FIG. 10 is a diagram illustrating an example of captured images grouped by a grouping process using feature vectors and imaging times.

In FIG. 10, the direction from the upper side toward the lower side in the drawing is set as the time axis (unit: second), rectangles in each of which a 4-digit number indicating a file name is written represent captured images (clips), and black circles on the corresponding time axis represent the imaging times. Various patterns are drawn in the rectangles representing the captured images, and the captured images grouped into the same group are represented by the same pattern. Each image captured by the camera 10 is given a file name that is a serial number.

For example, the five captured images having file names 0001 to 0005 are grouped into a group G1. The five captured images grouped into the group G1 are images captured in time zones close to one another in terms of time. The next five captured images (file names 0006 to 0010) are grouped into a group G2, the next two captured images (file names 0013 and 0015) are grouped into a group G3, and the next captured image (file name 0017) is independently grouped into a group G4.

The next three captured images (file names 0018 to 0020) are grouped into a group G5, the next two captured images (file names 0021 and 0022) are grouped into a group G6, and the next three captured images (file names 0023 to 0025) are grouped into a group G7. The next five captured images (file names 0026 to 0030) are grouped into a group G8, the next seven captured images (file names 0032 and 0034 to 0039) are grouped into a group G9, and the next captured image (file name 0040) is independently grouped into a group G10.

The next captured image (file name 0041) is independently grouped into a group G11, the next two captured images (file names 0042 and 0043) are grouped into a group G12, and the next two captured images (file names 0047 and 0048) are grouped into a group G13. The next captured image (file name 0049) is independently grouped into a group G14, the next four captured images (file names 0050, 0051, 0053, and 0054) are grouped into a group G15, and the next captured image (file name 0055) is independently grouped into a group G16.

As described above, in the grouping process to which the present disclosure is applied, captured images having similar features and close imaging times are grouped on the basis of feature vectors and imaging times, and the grouping result illustrated in FIG. 10 is obtained, for example. Thus, scenes can be divided for each group. For example, until the user can capture an excellent captured image, when imaging repeatedly with the same object or similar objects, with the same composition or similar compositions, or the like, the captured images can be grouped into the same group. A captured image to be used for a produced moving image is then selected from among the captured images in the same group. Also, as these captured images are presented as the same group serving as an aid of manual selection of captured images, the user can easily select a captured image to be actually used for a produced moving image from among the captured images of the corresponding object with the corresponding composition.

Figure 11:
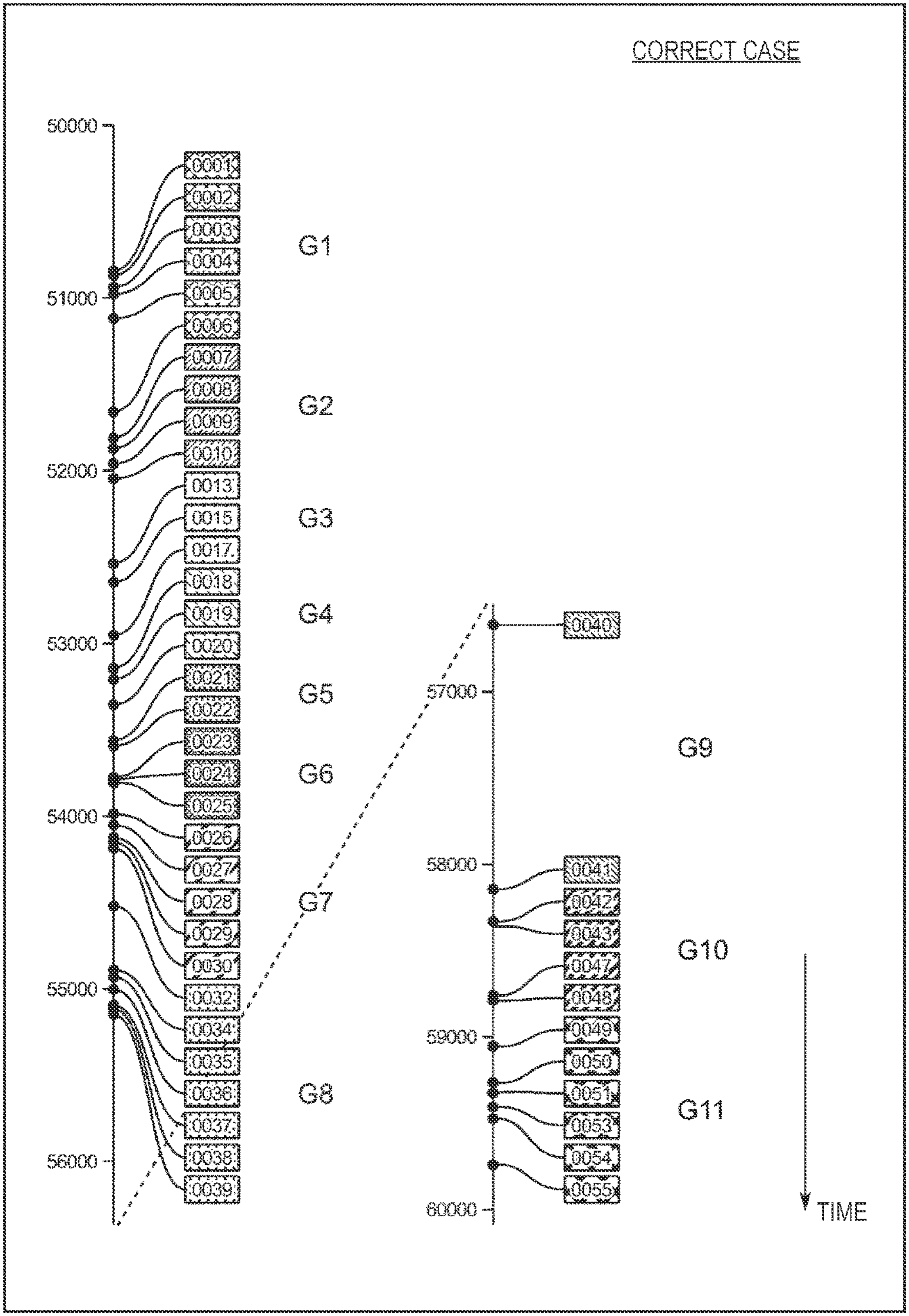
FIG. 11 is a diagram illustrating an example of a case where captured image grouping has been appropriately performed.
Figure 12:
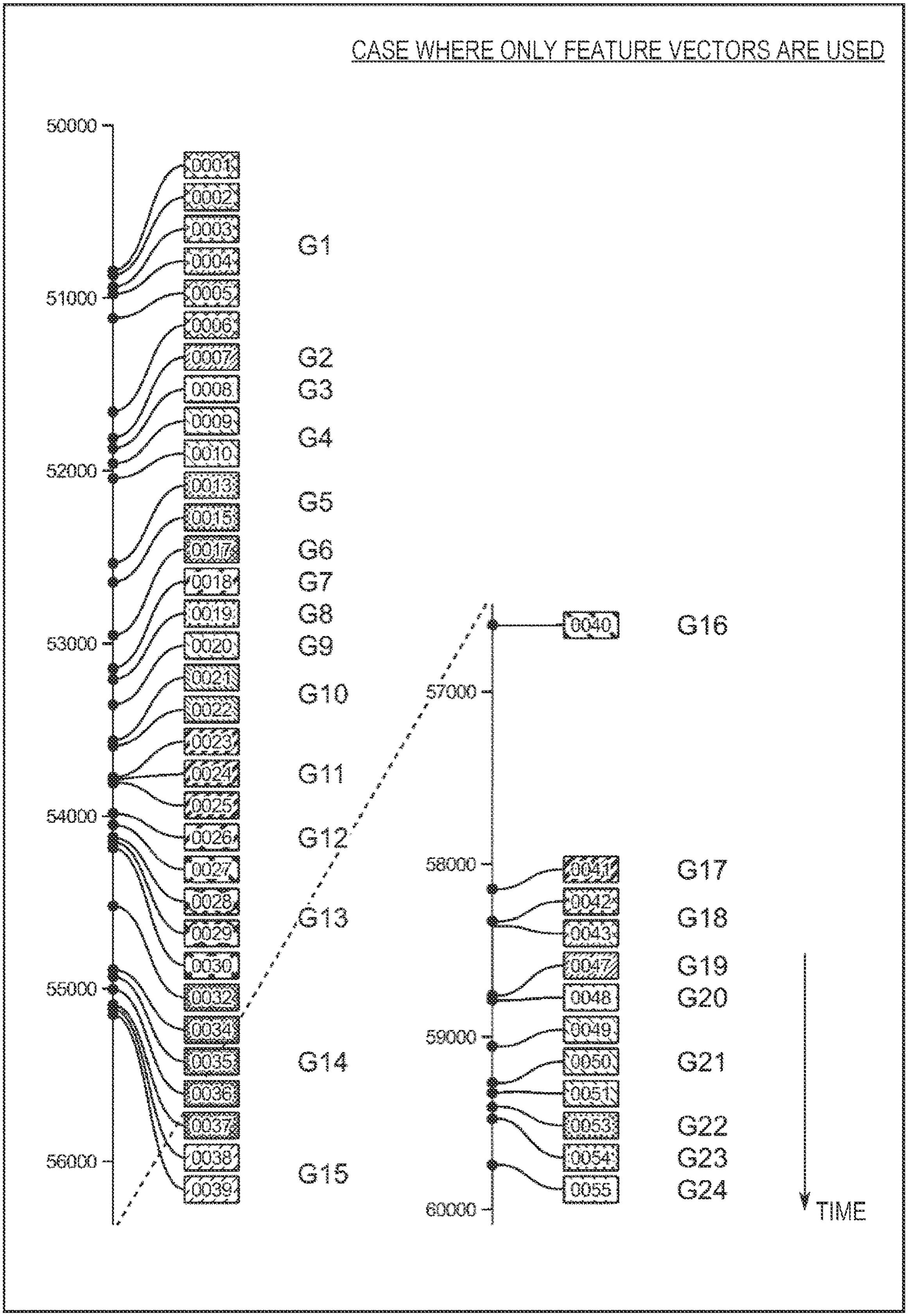
FIG. 12 is a diagram illustrating an example of captured image grouping using only feature vectors.

Here, for comparison with the grouping result shown in FIG. 10, results of grouping performed by other methods are shown in FIGS. 11 and 12. FIG. 11 illustrates an example case where captured images are grouped by a user's manual work or the like. That is, it can be said that the grouping result illustrated in FIG. 11 is a correct grouping result reflecting the intention of the user. FIG. 12 illustrates an example case where captured images are grouped using only feature vectors.

Comparing the grouping result illustrated in FIG. 10 with the grouping result illustrated in FIG. 11, there are some captured images grouped into different groups at the boundaries between groups, but most of the grouping is the same.

Here, in a case where (the file of) a captured image is deleted, the numbers as the file names of the captured images arranged in time series become inconsecutive, and the number allotted to the deleted captured image is skipped. In the grouping process to which the present disclosure is applied, grouping can be performed, skipping of serial numbers as file names being taken into consideration. That is, in a case where the numbers as the file names of the captured images are not consecutive, the contribution of the imaging times to be used in the grouping process is lowered, so that grouping taking into consideration skipping of serial numbers serving as file names can be performed.

Specifically, in the grouping result illustrated in FIG. 10, skipping of file names that are serial numbers is not taken into consideration. However, in a case where captured images (file names 0044 to 0046) between certain captured images (file names 0042 and 0043) and captured images (file names 0047 and 0048) are deleted by the user, the numbers as file names of the captured images are not consecutive, and therefore, the contribution of the imaging times is only required to be lowered. In this manner, the captured images (file names 0042, 0043, 0047, and 0048) having inconsecutive serial numbers as file names are grouped into the same group, and the grouping result can be made closer to the correct grouping result.

On the other hand, a comparison between the grouping result illustrated in FIG. 12 and the grouping result illustrated in FIG. 11 shows that, in the grouping result illustrated in FIG. 12, the captured images are grouped into a larger number of groups (grouping is performed more than necessary), and the grouping result is greatly different.

As described above, in the grouping process to which the present disclosure is applied, feature vectors and imaging times are used, so that a grouping result closer to the correct grouping result can be obtained, compared with a result in a case where only feature vectors are used. Furthermore, in the grouping process to which the present disclosure is applied, grouping taking into consideration skipping of serial numbers as file names is performed, a grouping result closer to the correct grouping result can be obtained. Thus, captured images can be divided into groups more accurately.

Next, the flow in a captured image grouping process to be performed by the processing unit 200 in the cloud server 20 is described. Captured image grouping is roughly divided into an extraction process of extracting feature vectors and imaging times from captured images, and a grouping process of grouping captured images using the feature vectors and the imaging times. Therefore, the processes will be described below in this order. Further, as both moving images and still images are input as captured images, a case where a moving image is input, and a case where a still image is input will be described.

<Flow in the Extraction Process>

Figure 13:
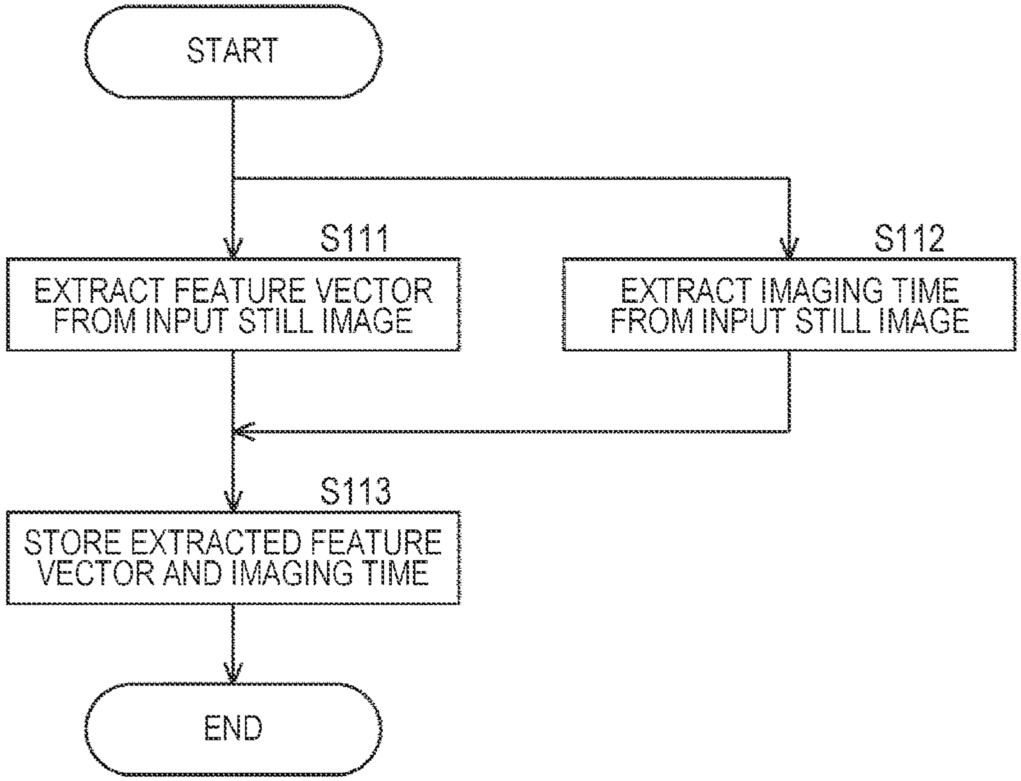
FIG. 13 is a flowchart illustrating a first example of a process of extracting feature vectors and imaging times of captured images.

A first example of the extraction process in a case where a still image is input as a captured image is first described, with reference to a flowchart shown in FIG. 13.

In step S111, the feature vector extraction unit 251 extracts a feature vector from the input still image. The feature vector extraction unit 251 uses the trained model 261, to output a feature vector with the still image as an input. Thus, the feature vector can be extracted from the still image.

In step S112, the imaging time extraction unit 252 extracts the imaging time from the input still image. The imaging time extraction unit 252 can extract the imaging time from the Exif information attached to the still image. The imaging time extraction process (S112) can be performed in parallel with the feature vector extraction process (S111).

When the processing in steps S111 and S112 is completed, the process moves to step S113. In step S113, the feature vector group recording control unit 253 associates the extracted feature vector with the extracted imaging time, and stores them into the storage unit 218.

As described above, in the first example of the extraction process, a feature vector and an imaging time are extracted from each input still image, and are associated with each other before stored as a feature vector group.

Figure 14:
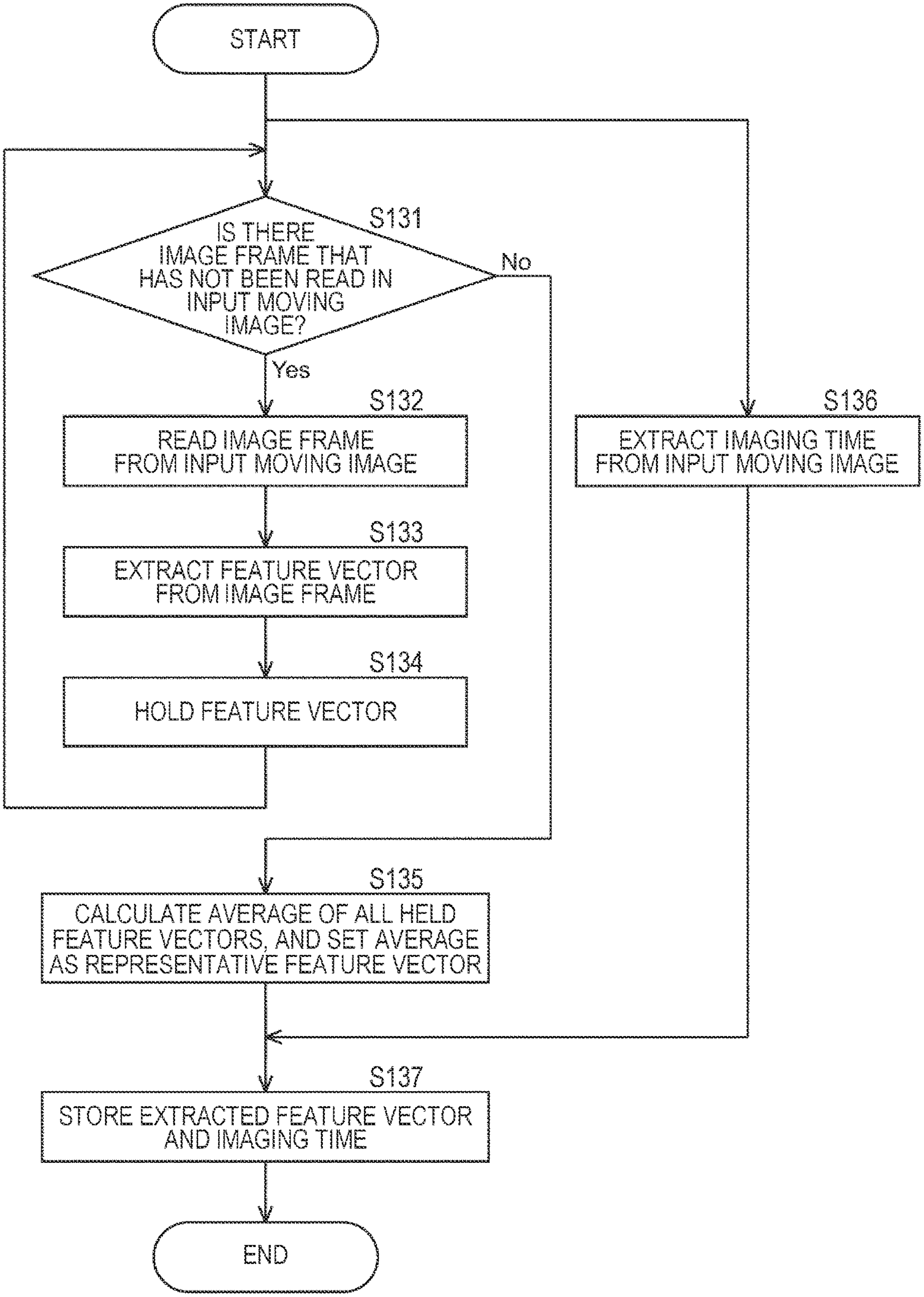
FIG. 14 is a flowchart illustrating a second example of a process of extracting feature vectors and imaging times of captured images.

Next, a second example of the extraction process in a case where a moving image is input as a captured image is described, with reference to a flowchart shown in FIG. 14.

In step S131, the processing unit 200 determines whether an image frame that has not been read remains in the input moving image.

In a case where it is determined in step S131 that an image frame that has not been read remains, the process moves on to step S132. In step S132, the processing unit 200 reads an image frame from the input moving image.

In step S133, the feature vector extraction unit 251 extracts a feature vector from the read image frame. The feature vector extraction unit 251 uses the trained model 261, to output a feature vector with the image frame as an input. Thus, the feature vector can be extracted from the image frame.

In step S134, the feature vector extraction unit 251 temporarily holds the extracted feature vector in the RAM 213.

When the series of processes in steps S132 to S134 is completed, the process returns to step S131. After that, the series of processes in steps S132 to S134 is repeated until it is determined in step S131 that there are no remaining image frames that have not been read. Feature vectors are then extracted from all the image frames constituting the input moving image, and are temporarily held in the RAM 213.

In a case where it is determined in step S131 that there are no remaining image frames that have not been read, the process moves on to step S135. In step S135, the calculation unit 262 calculates an average of all the feature vectors held in the RAM 213, and sets the average as a representative feature vector. Note that the representative value is not necessarily the average value, and a median value, a mode value, or the like may be used as described above.

In step S136, the imaging time extraction unit 252 extracts the imaging time from the input moving image. The imaging time extraction unit 252 can extract the imaging time from the metadata attached to the moving image. The imaging time extraction process (S136) can be performed in parallel with the feature vector extraction process (S131 to S135).

When the processing in steps S135 and S136 is completed, the process moves to step S137. In step S137, the feature vector group recording control unit 253 associates the representative feature vector with the imaging time, and stores them into the storage unit 218.

As described above, in the second example of the extraction process, the feature vector (representative feature vector) and the imaging time are extracted from each input moving image, and are associated with each other before stored as a feature vector group.

<Flow in the Grouping Process>

The grouping process is a process to be performed after the extraction process illustrated in FIG. 13 or 14 is completed. Therefore, when the grouping process is performed, the storage unit 218 stores a feature vector group in which the feature vectors extracted from the respective captured images (moving images and still images) are associated with imaging times.

A first example of the grouping process using feature vectors and imaging times is first described with reference to a flowchart shown in FIG. 15.

In step S151, the feature vector group recording control unit 253 reads the feature vector group stored in the storage unit 218. The read feature vector group is supplied to the grouping processing unit 254.

In step S152, the grouping processing unit 254 sorts the read feature vector group in order of imaging time. In step S153, the grouping processing unit 254 determines whether the processing has been completed up to the last feature vector that have been sorted.

In a case where it is determined in step S153 that the processing has not been completed up to the last feature vector, the process moves on to step S154. In step S154, the grouping processing unit 254 calculates a similarity between the preceding and subsequent feature vectors.

In step S155, the grouping processing unit 254 compares the calculated similarity with a preset threshold, and determines whether the similarity is lower than the threshold.

In a case where the similarity is determined not to be lower than the threshold in step S155, the process returns to step S153. Further, in a case where the processing has not been completed up to the last feature vector ("No" in S153), a similarity between the preceding and subsequent feature vectors is calculated for the next combination of feature vectors (S154), and threshold determination is performed (S155).

The series of processes in steps S154 and S155 is repeated, and, in a case where the similarity is determined to be lower than the threshold ("Yes" in S155), the process moves on to step S156.

In step S156, the grouping processing unit 254 divides the group between two captured images from which feature vectors having a calculated similarity (a similarity determined to be lower than the threshold) have been extracted.

When the process in step S156 is completed, the process returns to step S153. Further, in a case where the processing has not been completed up to the last feature vector ("No" in S153), the series of processes is performed, and grouping is performed between captured images from which feature vectors having a similarity lower than the threshold have been extracted. On the other hand, in a case where the processing has been completed up to the last feature vector ("Yes" in S153), the series of processes comes to an end.

As described above, in the first example of the grouping process, the similarity between the feature vectors included in a feature vector group sorted in the order of imaging time is calculated, and two captured images from which the feature vectors having the similarity calculated have been extracted are grouped on the basis of the result of the threshold determination performed on the similarity. In this manner, input moving images or still images are grouped, and a different scene is set for each group.

Figure 16:
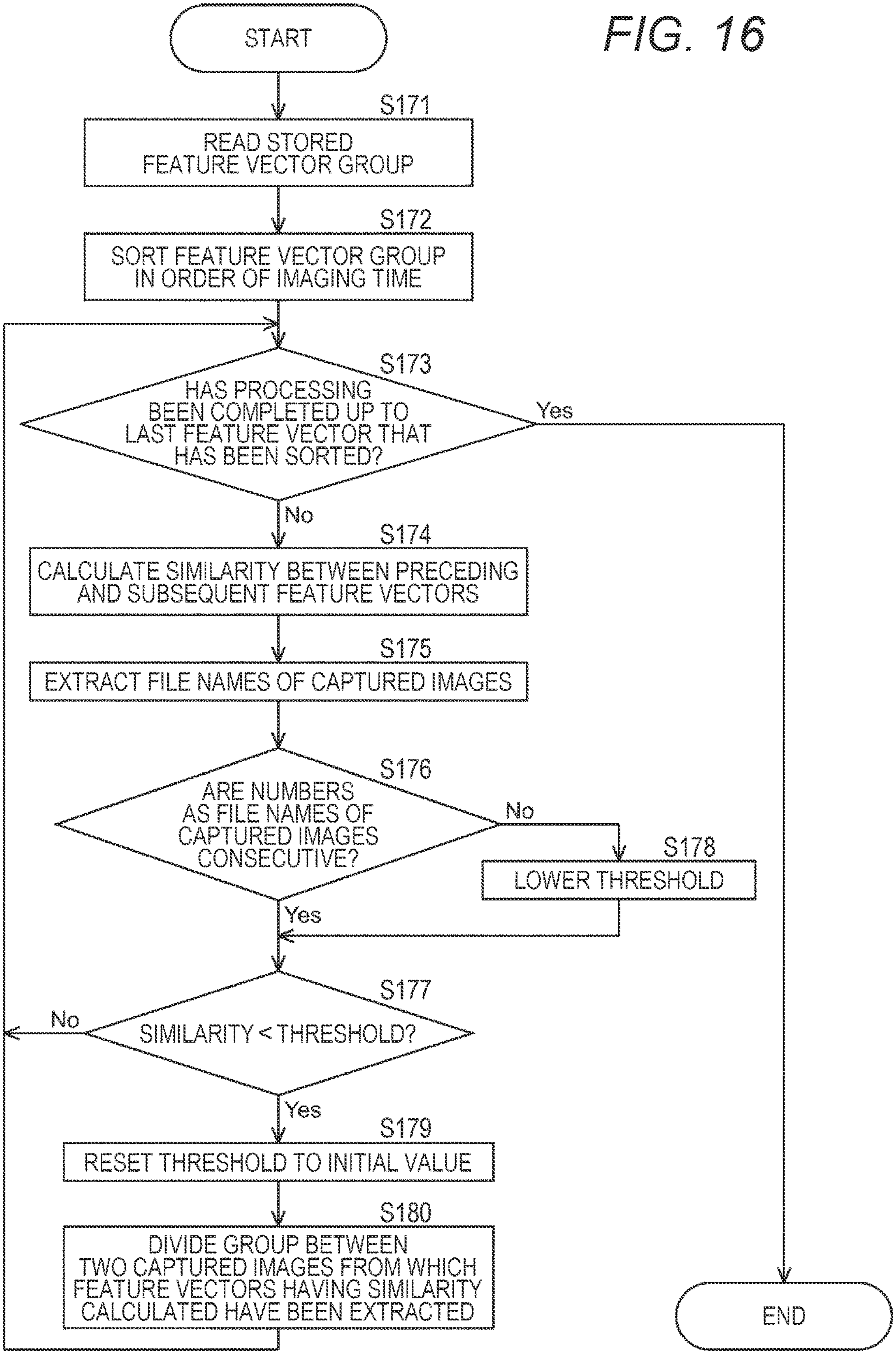
FIG. 16 is a flowchart illustrating a second example of grouping of captured images.

Next, a second example of the grouping process using feature vectors and imaging times is described with reference to a flowchart shown in FIG. 16. In the second example of the grouping process, grouping is performed, skipping of serial numbers as file names being taken into consideration, compared with the first example described above.

Figure 15:
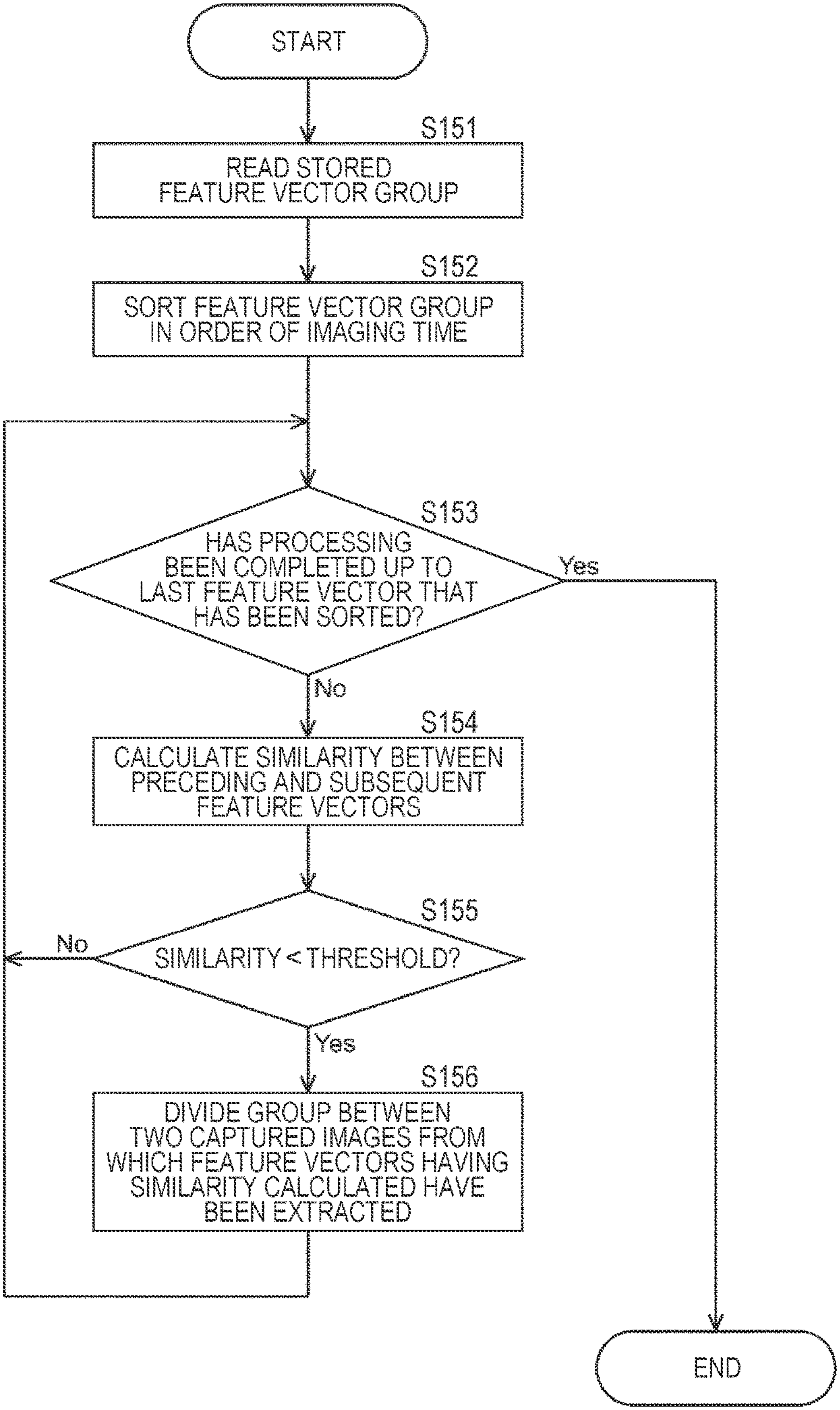
FIG. 15 is a flowchart illustrating a first example of grouping of captured images.

In steps S171 to S173, a read feature vector group is sorted in order of imaging time, and a check is made to determine whether the processing has been completed up to the last feature vector, as in steps S151 to S153 in FIG. 15.

In a case where it is determined in step S173 that the processing has not been completed up to the last feature vector, the process moves on to step S174. In step S174, the grouping processing unit 254 calculates a similarity between the preceding and subsequent feature vectors.

In step S175, the processing unit 200 extracts the file names of the captured images from which the feature vectors having the similarity calculated have been extracted. In step S176, the grouping processing unit 254 determines whether the extracted numbers as the file names are consecutive.

In a case where it is determined in step S176 that the numbers as the file names are consecutive, the process moves on to step S177. In step S177, the grouping processing unit 254 compares the calculated similarity with a preset threshold, and determines whether the similarity is lower than the threshold. In this threshold determination, the preset threshold is used as it is.

On the other hand, in a case where it is determined in step S176 that the numbers as the file names are not consecutive, the process moves on to step S178. In step S178, the grouping processing unit 254 lowers the threshold to be used in the threshold determination. As the threshold is lowered in this manner, the lower limit of the similarity in the threshold determination in step S177 is relaxed. That is, in a case where the numbers as the file names of the captured images are not consecutive, the contribution of the imaging time is lowered.

In a case where the similarity is determined not to be lower than the threshold in step S177, the process returns to step S173. Further, in a case where it is determined that the processing has not been completed up to the last feature vector ("No" in S173), a similarity between the preceding and subsequent feature vectors is calculated for the next combination of feature vectors (S174), and threshold determination is performed (S177). At this point of time, in a case where the numbers as the file names of the captured images are consecutive ("No" in S176), the threshold to be used in the threshold determination is set to be lower (S178).

The series of processes in steps S174 to S177 is repeated, and, in a case where the similarity is determined to be lower than the threshold, the process moves on to step S179. In step S179, the grouping processing unit 254 resets the threshold to be used in the threshold determination, to the initial value. As a result, the threshold adjusted in accordance with the file names of the captured images is reset to the preset threshold.

In step S180, the group is divided between two captured images from which feature vectors having a similarity (a similarity determined to be lower than the threshold) calculated have been extracted, as in step S156 in FIG. 15.

When the process in step S180 is completed, the process returns to step S173. Further, in a case where the processing has not been completed up to the last feature vector ("No" in S173), the series of processes is performed, and grouping is performed between the captured images from which feature vectors having a similarity lower than the threshold have been extracted, while the threshold is adjusted in accordance with a result of determination as to consecutiveness of the numbers as the file names. On the other hand, in a case where the processing has been completed up to the last feature vector ("Yes" in S173), the series of processes comes to an end.

As described above, in the second example of the grouping process, the similarity between the feature vectors included in a feature vector group sorted in the order of imaging time is calculated, the threshold is adjusted in accordance with a result of determination as to consecutiveness of the numbers as the file names, and two captured images from which the feature vectors having the similarity calculated have been extracted are grouped on the basis of the result of the threshold determination performed on the similarity using the adjusted threshold. In this manner, grouping is performed with skipping of serial numbers as file names being taken into consideration, and a grouping result as intended by the user can be obtained.

<Method of Selecting Images from a Group>

After grouping is performed on captured images including moving images and still images, the cloud server 20 can select (select) the captured images (clips) to be used for a produced moving image from the respective groups (scenes). When captured images are selected, the selection can be performed in accordance with the presence or absence of a shot mark.

A shot mark is a "mark" given to a captured image by the user at a desired timing. For example, during imaging, when the user wishes to set the image being captured by the camera 10 as a captured image to be used for a specific purpose (a moving image of an advertisement or the like), the user operates the operation unit 117 including an operation system such as buttons or a UI of a touch panel, so that a shot mark can be attached to the target captured image.

Figure 17:
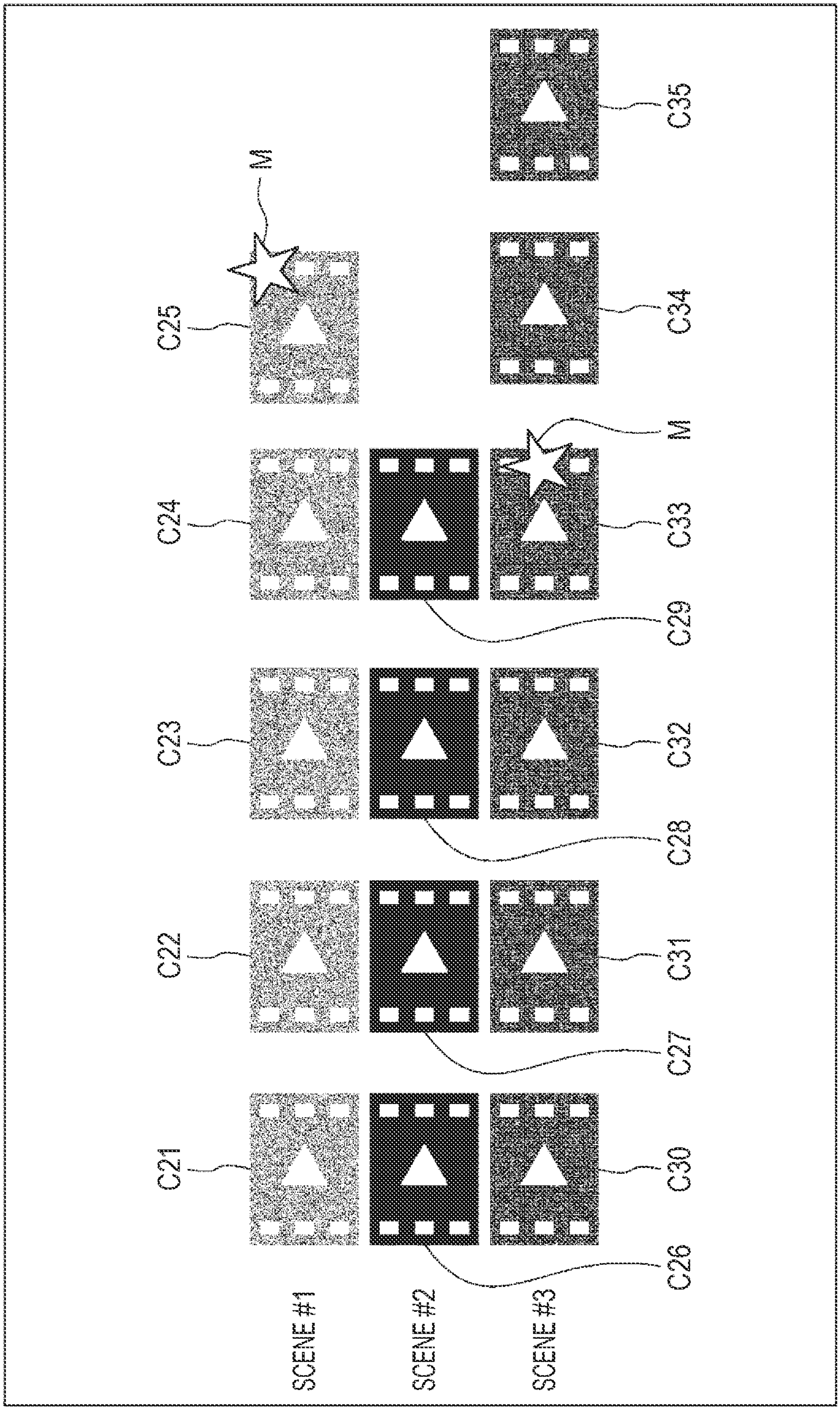
FIG. 17 is a diagram illustrating an example of display of grouped captured images.

FIG. 17 illustrates an example of captured images subjected to grouping. In FIG. 17, stars represent shot marks, and a captured image to which a shot mark is attached can be selected from each group. Specifically, a captured image C25 to which a shot mark M is attached is selected from among captured images C21 to C25 grouped into a scene #1.

On the other hand, in a case where there are no captured images provided with a shot mark, captured images can be selected on the basis of the feature similarity. As illustrated in FIG. 17, it is assumed that the captured image C25 to which the shot mark M is attached is present in the scene #1, but there is not a captured image to which the shot mark M is attached in a scene #2. In this case, the captured image C25 is selected in the scene #1. In the scene #2, however, the feature amount of each of the grouped captured images C26 to C29 is compared with the feature amount of the captured image C25 selected in the scene #1, and a captured image having a long distance (a low similarity) from the feature amount of the captured image C25 can be selected. As the feature amounts to be compared, the feature vectors extracted by the feature vector extraction unit 251 can be used.

Alternatively, in a case where there is not a captured image provided with a shot mark, a captured image may be selected according to a predetermined rule. For example, the last clip in the scene may be selected.

<Modifications>

In the above description, the processing unit 200 of the cloud server 20 performs the captured image grouping process in the moving image production system 1. However, the process may be performed by a device other than the cloud server 20. For example, a processing unit of the terminal device 30 may have the functions corresponding to the processing unit 200, to perform all or part of the captured image grouping process.

The process in each step in the flowcharts described above can be performed by hardware, or can be performed software. In a case where the series of processes is performed by software, the program that forms the software is installed into a computer of each device.

The program to be executed by the computer can be recorded in removable recording media as package media or the like to be distributed, for example. Furthermore, the program can be distributed via a wired or wireless transmission medium such as a LAN, the Internet, or digital broadcasting.

In the computer, the program can be installed into a storage unit via an input/output I/F when a removable recording medium is mounted in the drive. Alternatively, the program can be received by a communication unit via a wired or wireless transmission medium, and be installed into a storage unit. In other cases, the program can be installed beforehand into a ROM or a storage unit.

Here, in the present specification, the processes to be performed by the computer in accordance with the program are not necessarily performed on a time-series basis according to the sequences shown in the flowcharts. In other words, the processes to be performed by the computer in accordance with the program include processes to be performed in parallel or independently of one another (parallel processes or object-based processes, for example).

Furthermore, the program may be processed by one computer (processor), or may be subjected to distributed processing by a plurality of computers. Moreover, the program may be transferred to a remote computer, and be executed therein.

Embodiments of the present disclosure are not limited to the above embodiments, and various modifications can be made without departing from the scope of the present disclosure.

In the present specification, the term "automatic" means that a device such as the cloud server 20 performs processing without a direct operation performed by the user, and the term "manual" means that processing is performed via a direct operation performed by the user. Furthermore, the effects described in the present specification are merely examples and are not restrictive, and other effects may be achieved.

In the present specification, a system is intended to mean a set of a plurality of components (devices, modules (parts), or the like), and it does not matter whether or not all the components are disposed in the same housing. Therefore, a plurality of devices housed in separate housings and connected via a network, and a single device with a plurality of modules disposed in one housing are both systems.

Furthermore, the present disclosure can have the following configurations.

(1)

An image processing apparatus including a processing unit that extracts, from a captured image, a feature amount related to the captured image, extracts, from the captured image, an imaging time at which the captured image has been imaged, and groups a plurality of the captured images, on the basis of the feature amounts and the imaging times extracted from the respective captured images.

(2)

The image processing apparatus of (1), in which the processing unit extracts file names of the captured images, and groups a plurality of the captured images, on the basis of the feature amounts, the imaging times, and the file names extracted from the respective captured images.

(3)

The image processing apparatus of (1) or (2), in which the feature amount is a feature vector, and the processing unit extracts the feature vector from the captured image, using a trained model that has been trained by machine learning.

(4)

The image processing apparatus of (3), in which the trained model is a deep neural network (DNN) that has been trained, an input being an image serving as training data, an output being a feature amount related to the image.

(5)

The image processing apparatus of any one of (1) to (4), in which the captured image is a moving image or a still image, and the processing unit extracts the feature amount from each of image frames constituting the moving image, in a case where the captured image is the moving image, and calculates a representative feature amount as a representative value from a plurality of the feature amounts extracted.

(6)

The image processing apparatus of any one of (1) to (5), in which the processing unit calculates a similarity between a plurality of feature amounts included in a feature amount group that is a set of the feature amounts extracted from the respective captured images, and groups a plurality of the captured images, on the basis of a result of threshold determination as to the similarity calculated.

(7)

The image processing apparatus of (6), in which the processing unit sorts the feature amount group in order of the imaging time, calculates a similarity between feature amounts before and after feature amounts included in the sorted feature amount group, compares the calculated similarity with a threshold, and, in a case where the similarity is lower than the threshold, divides the group between two of the captured images from which the feature amounts having the similarity calculated have been extracted.

(8)

The image processing apparatus of (6), in which the processing unit sorts the feature amount group in order of the imaging time, calculates a similarity between feature amounts before and after feature amounts included in the sorted feature amount group, sets a threshold, on the basis of file names of two of the captured images from which the feature amounts having the similarity calculated have been extracted, compares the calculated similarity with the set threshold, and, in a case where the similarity is lower than the threshold, divides the group between two of the captured images from which the feature amounts having the similarity calculated have been extracted.

(9)

The image processing apparatus of (8), in which the processing unit determines whether numbers as file names of two of the captured images from which the feature amounts having the similarity calculated have been extracted are consecutive, and sets the threshold to a smaller value in a case where the numbers as the file names of the two of the captured images are determined not to be consecutive.

(10)

The image processing apparatus of any one of (1) to (9), further including a storage unit that associates the feature amount and the imaging time extracted from each of the captured images with each other, and stores the feature amount and the imaging time associated with each other, in which the processing unit groups a plurality of the captured images, on the basis of the feature amounts and the imaging times stored and associated with each other in the storage unit.

(11)

The image processing apparatus of any one of (1) to (10), which is formed as a server that processes the captured image received via a network, the captured image being imaged by a camera that is operated by a user, in which the captured images that are grouped are transmitted, via a network, to a terminal device that is operated by a user.

(12)

An image processing method including:

by an image processing apparatus, extracting, from a captured image, a feature amount related to the captured image;

extracting, from the captured image, an imaging time at which the captured image has been imaged; and grouping a plurality of the captured images, on the basis of the feature amounts and the imaging times extracted from the respective captured images.

(13)

A program for causing a computer to function as a processing unit that extracts, from a captured image, a feature amount related to the captured image, extracts, from the captured image, an imaging time at which the captured image has been imaged, and groups a plurality of the captured images, on the basis of the feature amounts and the imaging times extracted from the respective captured images.

REFERENCE SIGNS LIST

1 Moving image production system
10 Camera
20 Cloud server
30 Terminal device
40-1, 40-2, 40 Network

200 Processing unit
211 CPU
218 Storage unit
251 Feature vector extraction unit
252 Imaging time extraction unit
253 Feature vector group recording control unit
254 Grouping processing unit
261 Trained model
262 Calculation unit

The invention claimed is:

1. An image processing apparatus comprising
a memory storing a program, and
at least one processor configured to execute the program to perform operations comprising:
extracting, from captured images, feature amounts respectively related to the captured images,
extracting, from the captured images, imaging times at which the captured images have respectively been imaged;
grouping the captured images on a basis of the feature amounts and the imaging times;
calculating a similarity between feature amounts included in a feature amount group among the extracted feature amounts to provide a similarity calculation value;
sorting the feature amount group in order of the imaging times;
determining a set threshold on a basis of file names of two of the captured images for which calculating the similarity is performed;
comparing the similarity calculation value with the set threshold;
in a case where the similarity calculation value is lower than the set threshold, performing a group division between the two of the captured images;
determining whether numbers as the file names of the two of the captured images are consecutive; and
updating the set threshold to a smaller value in a case where the numbers are not consecutive.

2. The image processing apparatus according to claim 1, wherein the operations further comprise:
extracting the file names of the captured images; and
grouping the captured images on a basis of the feature amounts, the imaging times, and the file names.

3. The image processing apparatus according to claim 1, wherein the feature amounts are feature vectors, and the operations further comprise extracting the feature vectors from the captured images using a trained model that has been trained by machine learning.

4. The image processing apparatus according to claim 3, wherein the trained model is a deep neural network (DNN) that has been trained using input images to produce associated output feature amounts.

5. The image processing apparatus according to claim 1, wherein the captured images are one of moving images or still images, and the operations further comprise:
extracting the feature amounts from each of image frames constituting a corresponding moving image, in a case where the captured images are moving images; and
calculating a representative feature amount as a representative value from the feature amounts extracted.

6. The image processing apparatus according to claim 1, wherein the operations further comprise:
associating the feature amounts and the imaging times with each other, and storing, in memory, the feature amounts and the imaging times associated with each other; and
grouping the captured images on a basis of the feature amounts and the imaging times that are stored as being associated with each other.

7. The image processing apparatus according to claim 1, which is formed as a server that processes the captured images as received via a network, the captured images being imaged by a camera that is operated by a user, wherein
a moving image produced on a basis of the captured images is transmitted, via a network, to a terminal device that is operated by a user.

8. An image processing method comprising:
extracting, from captured images, feature amounts respectively related to the captured images,
extracting, from the captured images, imaging times at which the captured images have respectively been imaged;
grouping the captured images on a basis of the feature amounts and the imaging times;
calculating a similarity between feature amounts included in a feature amount group among the extracted feature amounts to provide a similarity calculation value;
sorting the feature amount group in order of the imaging times;
determining a set threshold on a basis of file names of two of the captured images for which calculating the similarity is performed;
comparing the similarity calculation value with the set threshold;
in a case where the similarity calculation value is lower than the set threshold, performing a group division between the two of the captured images;
determining whether numbers as the file names of the two of the captured images are consecutive; and
updating the set threshold to a smaller value in a case where the numbers are not consecutive.

9. A non-transitory computer readable medium storing a program, the program being executable by a processor to perform operations comprising:
extracting, from captured images, feature amounts respectively related to the captured images,
extracting, from the captured images, imaging times at which the captured images have respectively been imaged;
grouping the captured images on a basis of the feature amounts and the imaging times;
calculating a similarity between feature amounts included in a feature amount group among the extracted feature amounts to provide a similarity calculation value;
sorting the feature amount group in order of the imaging times;
determining a set threshold on a basis of file names of two of the captured images for which calculating the similarity is performed;
comparing the similarity calculation value with the set threshold;
in a case where the similarity calculation value is lower than the set threshold, performing a group division between the two of the captured images;
determining whether numbers as the file names of the two of the captured images are consecutive; and
updating the set threshold to a smaller value in a case where the numbers are not consecutive.

10. The non-transitory computer readable medium according to claim 9, wherein the operations further comprise:
extracting the file names of the captured images; and
grouping the captured images on a basis of the feature amounts, the imaging times, and the file names.

11. The non-transitory computer readable medium according to claim 9, wherein the feature amounts are feature vectors, and the operations further comprise extracting the feature vectors from the captured images using a trained model that has been trained by machine learning.

12. The non-transitory computer readable medium according to claim 11, wherein the trained model is a deep neural network (DNN) that has been trained using input images to produce associated output feature amounts.

13. The non-transitory computer readable medium according to claim 9, wherein the captured images are one of moving images or still images, and the operations further comprise:

extracting the feature amounts from each of image frames constituting a corresponding moving image, in a case where the captured images are moving images; and calculating a representative feature amount as a representative value from the feature amounts extracted.

14. The non-transitory computer readable medium according to claim 9, wherein the operations further comprise:

associating the feature amounts and the imaging times with each other, and storing, in memory, the feature amounts and the imaging times associated with each other; and grouping the captured images on a basis of the feature amounts and the imaging times that are stored as being associated with each other.

* * * * *